(12) United States Patent
Matsunobu et al.

(10) Patent No.: US 8,483,515 B2
(45) Date of Patent: Jul. 9, 2013

(54) IMAGE PROCESSING METHOD, IMAGE PROCESSOR, INTEGRATED CIRCUIT, AND RECORDING MEDIUM

(75) Inventors: Toru Matsunobu, Osaka (JP); Kenji Takita, Osaka (JP); Satoshi Sakaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 13/044,603

(22) Filed: Mar. 10, 2011

(65) Prior Publication Data

US 2011/0222783 A1    Sep. 15, 2011

(30) Foreign Application Priority Data

Mar. 11, 2010  (JP) ................................. 2010-053978

(51) Int. Cl.
    *G06K 9/32*    (2006.01)
(52) U.S. Cl.
    USPC .......................................... 382/299; 382/148
(58) Field of Classification Search
    USPC ................. 341/131; 345/3.3, 698; 348/14.12, 348/208.13, 333.11, E13.017, E11.013, 252, 348/597, 625, E5.052; 358/1.2, 3.07; 382/148, 382/299, 199, 266, 269
    See application file for complete search history.

(56) References Cited

U.S. PATENT DOCUMENTS

| | | | |
|---|---|---|---|
| 2002/0172434 A1 | 11/2002 | Freeman et al. | |
| 2007/0247529 A1 | 10/2007 | Toma et al. | |
| 2011/0176744 A1* | 7/2011 | Ko et al. | ....................... 382/264 |

FOREIGN PATENT DOCUMENTS

| | | |
|---|---|---|
| JP | 2003-018398 | 1/2003 |
| JP | 2007-305113 | 11/2007 |

* cited by examiner

*Primary Examiner* — Gregory F Cunningham
(74) *Attorney, Agent, or Firm* — Wenderoth, Lind & Ponack, L.L.P.

(57) ABSTRACT

An image processor generates an output image of a resolution higher than a resolution of an input image, using the input image. The image processor includes: an obtaining unit configured to obtain an edge strength of one of the input image and an image corresponding to the input image; a calculating unit configured to calculate, based on the edge strength, J that is a count of data items to be used for generating a synthesized image to be used in generating the output image, where J is an integer equal to or larger than 2; and a generating unit configured to generate the synthesized image by synthesizing J data items, and generate the output image using the synthesized image.

13 Claims, 22 Drawing Sheets

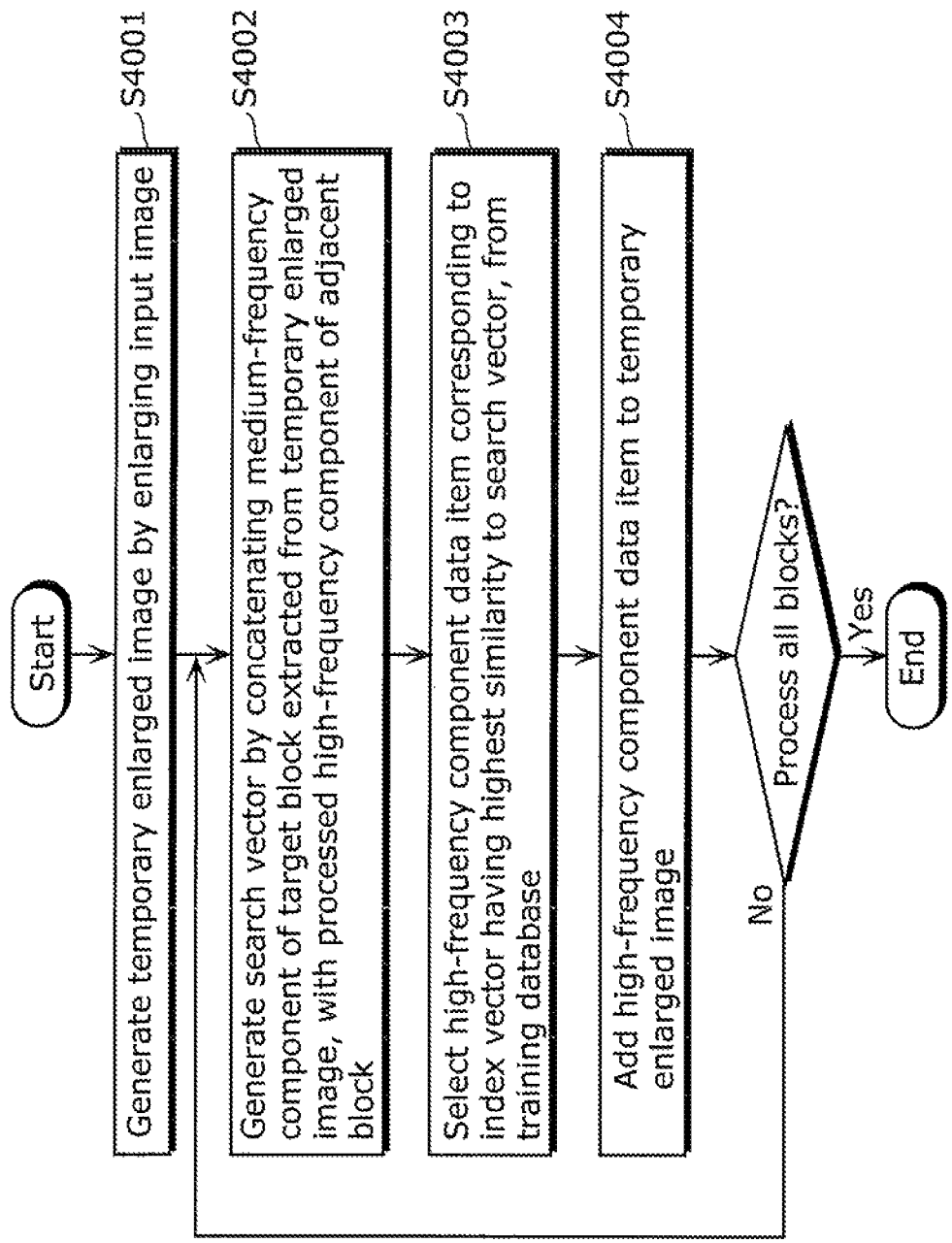

IMAGE PROCESSING METHOD, IMAGE PROCESSOR, INTEGRATED CIRCUIT, AND RECORDING MEDIUM

BACKGROUND OF THE INVENTION (1) Field of the Invention

The present invention relates to an image processing method, an image processor, an integrated circuit, and a recording medium for generating an output image of a resolution higher than a resolution of an input image, using the input image.

(2) Description of the Related Art

When a resolution of an image to be displayed on a high resolution display is lacking, it is necessary to enlarge the image so as to match the resolution of the image to a resolution of the high resolution display.

Although methods of increasing the resolution of an image have been conventionally suggested, there is a limit on processing capacity for the practical use. Thus, the combination of simple image enlargement by interpolation and image enhancement processing has supported the methods. Thus, problems of image degradation have occurred, such as blurring and noticeable jaggies in an edge.

Recent technological advances in performance of hardware has enabled allocation of larger processing capacity to the image enlargement processing. Here, attention is currently focused on the super-resolution technique capable of converting an image to an image with high quality and high resolution through complex processing.

In the super-resolution technique, a method using a training database storing data learned from examples of correspondence between high-resolution images and low-resolution images is called a training-based super-resolution.

FIG. 21 is a block diagram illustrating a configuration of an image processor 600 that performs the same processing as in the conventional training-based super-resolution disclosed in Patent Reference 1. Hereinafter, the technique disclosed in Patent Reference 1 (Japanese Unexamined Patent Application Publication No. 2003-018398) is also referred to as a conventional technique A.

As illustrated in FIG. 21, the image processor 600 includes a training database 610, an image enlargement unit 605, a search vector generating unit 620, a training data search unit 630, and an addition unit 680.

Next, operations of the image processor 600 will be described.

FIG. 22 is a flowchart of the procedure performed by the image processor 600 in FIG. 21.

The image processor 600 converts an input image 601 of a low resolution into an output image 602 of a high resolution, using the training database 610 that stores index vectors and high-frequency component data items 631 that are respectively associated with the index vectors. Each of the index vectors is an image of a low-frequency component.

The training database 610 stores the index vectors and the high-frequency component data items 631 that are respectively associated with the index vectors. Each of the index vectors and the high-frequency component data items 631 is a block-shaped image.

At Step S4001, the image enlargement unit 605 generates a temporary enlarged image 606 by enlarging the input image 601.

The following processes are performed on each target block included in the input image 601.

At Step S4002, the search vector generating unit 620 generates a search vector 621 by concatenating a medium-frequency component data item of a target block extracted from the temporary enlarged image 606, with a high-frequency component data item of an adjacent block which has been processed. In other words, the search vector 621 is composed of the medium-frequency component data item and the high-frequency component data item in an overlap region with the adjacent block. The search vector 621 is a block-shaped image.

At Step S4003, the training data search unit 630 selects one of the high-frequency component data items 631 that corresponds to an index vector having the highest similarity to the search vector 621, from among the index vectors stored in the training database 610.

At Step S4004, the addition unit 680 adds the selected high-frequency component data item 631 to the temporary enlarged image 606. Thereby, an output image 602 of a high resolution is generated.

In the conventional training-based scheme, one of the high-frequency component data items 631 that corresponds to the index vector having the highest similarity to the search vector 621 is searched. Since only one of the high-frequency component data items 631 is selected from the database in this method, when the high-frequency component data item 631 selected from the training database 610 indicates noise, the noise immunity is low.

Thus, since a bumpy edge and artifacts occur in the output image 602 of the high resolution, the image quality is degraded. Furthermore, since the search vector 621 includes the overlap region included in a high-frequency component and in the adjacent region, there is a possibility of error propagation.

SUMMARY OF THE INVENTION

However, the conventional configuration has the following problems.

In the conventional technique A, one of the high-frequency component data items that corresponds to the index vector having the highest similarity to the search vector is searched. In other words, only one of the high-frequency component data items is selected from the training database.

Then, a high-resolution output image is generated using the selected high-frequency component data item. In other words, a part of the output image is generated using one data item. Thus, when the selected data item is an image indicating noise, the output image to be generated is the image indicating noise. In other words, image quality of the output image is degraded, when a particular data item is selected.

The present invention has been conceived to solve the problems, and has an object of providing an image processing method, an image processor, and others for suppressing image degradation in the output image.

To achieve the object, the image processing method according to an aspect of the present invention is an image processing method of generating an output image of a resolution higher than a resolution of an input image, using the input image, and includes: obtaining an edge strength of one of the input image and an image corresponding to the input image; calculating, based on the edge strength, J that is a count of data items to be used for generating a synthesized image to be used in generating the output image, where J is an integer equal to or larger than 2; and generating the synthesized image by synthesizing J data items, and generating the output image using the synthesized image.

In other words, the image processing method according to an aspect of the present invention is an image processing method of generating an output image of a resolution higher than a resolution of an input image, using the input image, and includes: obtaining an edge strength of one of the input image and an image corresponding to the input image; calculating, based on the edge strength, J that is a count of data items to be used for generating a synthesized image to be used in generating the output image, where J is an integer equal to or larger than 2; and generating the synthesized image by synthesizing J data items, and generating the output image using the synthesized image.

In other words, J that is the count of data items necessary for generating the synthesized image is calculated based on the edge strength. As a result, the synthesized image is generated by synthesizing data items having the calculated count J. In other words, the synthesized image is obtained by synthesizing the J data items. Assuming that one of data items to be synthesized indicates noise, the synthesized image is an image in which noise is suppressed. As a result, it is possible to suppress image degradation in an output image generated using the synthesized image.

Preferably, in the calculating of J, a larger J is calculated as the edge strength is greater, and a smaller J is calculated as the edge strength is smaller.

Preferably, the image processing method further includes: enlarging the input image to generate an enlarged image; and selecting, from K first training data items in a training database, L first training data items respectively corresponding to L second training data items similar to first feature data indicating a feature of a target block included in the enlarged image, the training database storing K pairs of training data items of the K first training data items and K second training data items that are respectively associated with the K first training data items, each of the first training data items being obtained from a high-frequency component of a training image, and each of the second training data items being obtained from at least a low-frequency component of the training image, where K is an integer equal to or larger than 2, and L satisfies $2 \leq L \leq K$, wherein the data items synthesized in the synthesizing are the first training data items, and in the generating, the synthesized image is generated by synthesizing J first training data items from among the L first training data items, and the output image is generated by adding the synthesized image to the enlarged image, where J satisfies $2 \leq J \leq L$.

Preferably, the image processing method further includes extracting the first feature data from the target block.

Preferably, in the selecting, a similarity between the first feature data and each of the K second training data items is calculated, and the L first training data items which respectively correspond to the top L second training data items having higher similarities to the first feature data are selected.

Preferably, the synthesized image is larger than the target block, the image processing method further includes calculating, based on the edge strength, a region size that is a size of an overlap region obtained by synthesizing at least parts of a plurality of synthesized images including the synthesized image, the overlap region being equal to or smaller than the synthesized image and larger than the target block, and in the generating, the synthesized image of the calculated region size among the synthesized images is added to the enlarged image.

Preferably, in the calculating of a region size, a larger region size is calculated as the edge strength is greater.

Preferably, in the generating, a weighted sum of the enlarged image and the synthesized image of the region size is calculated, based on the region size.

Preferably, in the obtaining, the edge strength is obtained by calculating an edge strength of a block image that is a part of the input image, and the target block is an image obtained by enlarging the block image.

Preferably, in the obtaining, the edge strength is obtained by calculating an edge strength based on values obtained by a difference between the target block and each of the L first training data items.

Preferably, the first feature data is an image of a medium-frequency component in the target block.

Preferably, in the obtaining, the edge strength is obtained by calculating an edge strength of a block image that is a part of the input image, and in the calculating of J, J that is a count of reference images necessary for generating the synthesized image is calculated based on the edge strength, the image processing method further includes performing a position matching process using the target block in the input image and the J reference images, and in the generating, the synthesized image is generated by synthesizing respective blocks of the J reference images whose positions match a position of the target block based on displacement amounts obtained by the position matching process, and the output image is generated using the synthesized image.

The image processor according to an aspect of the present invention is an image processor that generates an output image of a resolution higher than a resolution of an input image, using the input image, and includes: an obtaining unit configured to obtain an edge strength of one of the input image and an image corresponding to the input image; a calculating unit configured to calculate, based on the edge strength, J that is a count of data items to be used for generating a synthesized image to be used in generating the output image, where J is an integer equal to or larger than 2; and a generating unit configured to generate the synthesized image by synthesizing J data items, and generate the output image using the synthesized image.

The integrated circuit according to an aspect of the present invention is an integrated circuit that generates an output image of a resolution higher than a resolution of an input image, using the input image, and includes: an obtaining unit configured to obtain an edge strength of one of the input image and an image corresponding to the input image; a calculating unit configured to calculate, based on the edge strength, J that is a count of data items to be used for generating a synthesized image to be used in generating the output image, where J is an integer equal to or larger than 2; and a generating unit configured to generate the synthesized image by synthesizing J data items, and generate the output image using the synthesized image.

The recording medium according to an aspect of the present invention is a non-transitory computer-readable recording medium on which a program, for an image processor that generates an output image of a resolution higher than a resolution of an input image, using the input image, is stored, and the program causes a computer to execute: obtaining an edge strength of one of the input image and an image corresponding to the input image; calculating, based on the edge strength, J that is a count of data items to be used for generating a synthesized image to be used in generating the output image, where J is an integer equal to or larger than 2; and generating the synthesized image by synthesizing J data items, and generating the output image using the synthesized image.

The present invention can suppress image degradation in an output image.

FURTHER INFORMATION ABOUT TECHNICAL BACKGROUND TO THIS APPLICATION

The disclosure of Japanese Patent Application No. 2010-053978 filed on Mar. 11, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 22 is a flowchart of the procedure performed by the conventional image processor.

DESCRIPTION OF THE PREFERRED EMBODIMENTS

Figure 1:
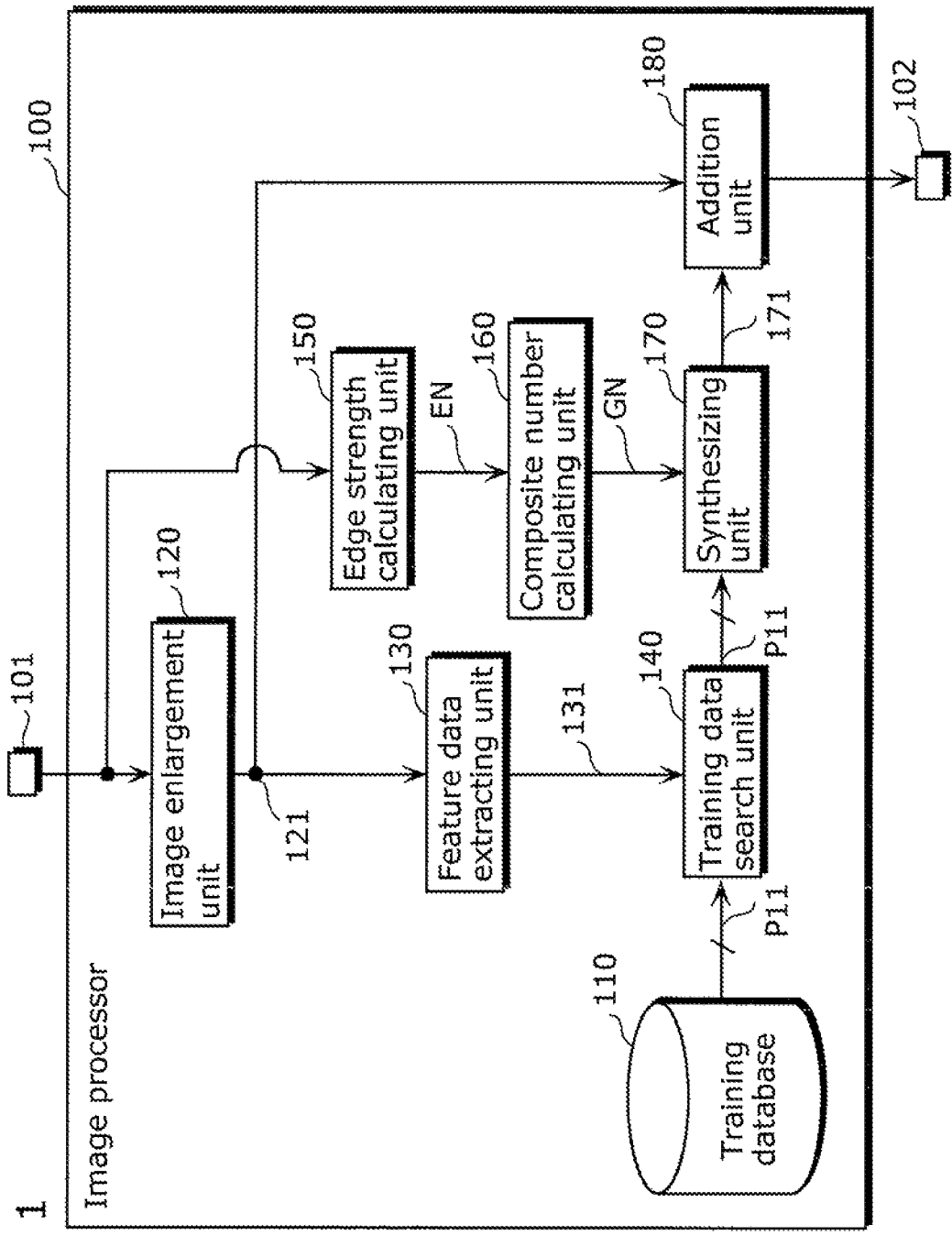
FIG. 1 is a block diagram illustrating a configuration of an image processor according to Embodiment 1 in the present invention.

Embodiments of the present invention will be described hereinafter. The same reference numerals are attached to the same constituent elements in the description. The names and the functions are all the same. Thus, there are cases where the detailed description will be omitted for these constituent elements.

Embodiment 1

FIG. 1 is a block diagram illustrating a configuration of an image processor 100 according to Embodiment 1 in the present invention.

The image processor 100 generates an output image 102 of a resolution higher than that of an input image 101 received from outside of the image processor 100, using the input image 101. The input image 101 may be any one of a moving image and a still image.

As illustrated in FIG. 1, the image processor 100 includes a training database 110, an image enlargement unit 120, a feature data extracting unit 130, a training data search unit 140, an edge strength calculating unit 150, a composite number calculating unit 160, a synthesizing unit 170, and an addition unit 180.

First, the training database 110 will be described.

Figure 2:
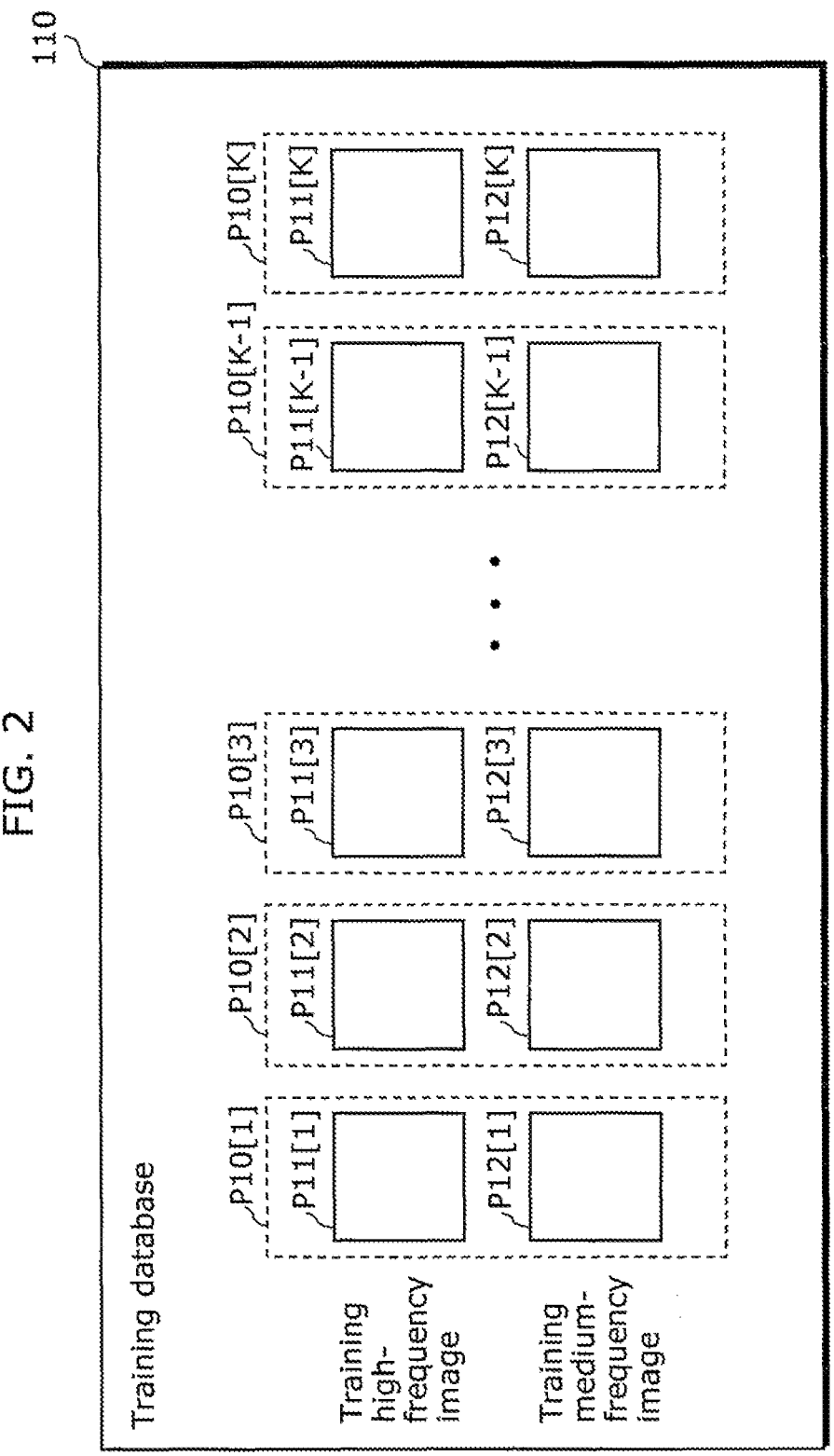
FIG. 2 schematically illustrates a training database.

As illustrated in FIG. 2, the training database 110 stores training high-frequency images P11[1], P11[2], ..., P11[K], and training medium-frequency images P12[1], P12[2], ..., P12[K]. Here, K is equal to or larger than 2.

Hereinafter, each of the training high-frequency images P11[1], P11[2], ..., P11[K] is also simply referred to as a training high-frequency image P11. Furthermore, each of the training medium-frequency images P12[1], P12[2], ..., P12[K] is also simply referred to as a training medium-frequency image P12.

The training database 110 stores training image pairs of the training high-frequency images P11 and the training medium-frequency images P12 that are associated with each other. More specifically, the training database 110 stores the training image pairs P10[1], P10[2], ..., P10[K].

Hereinafter, each of the training image pairs P10[1], P10[2], ..., P10[K] is also simply referred to as a training image pair P10. The K training image pairs P10 are different from each other.

Each of the training image pairs P10 is a training image pair in which the training high-frequency image P11 and the training medium-frequency image P12 that are generated from the same block in the same image are associated with each other.

Next, a method of generating the training high-frequency image P11 and the training medium-frequency image P12 will be described. The training high-frequency image P11 and the training medium-frequency image P12 are generated by a training image generating apparatus 50 to be described hereinafter.

Figure 3:
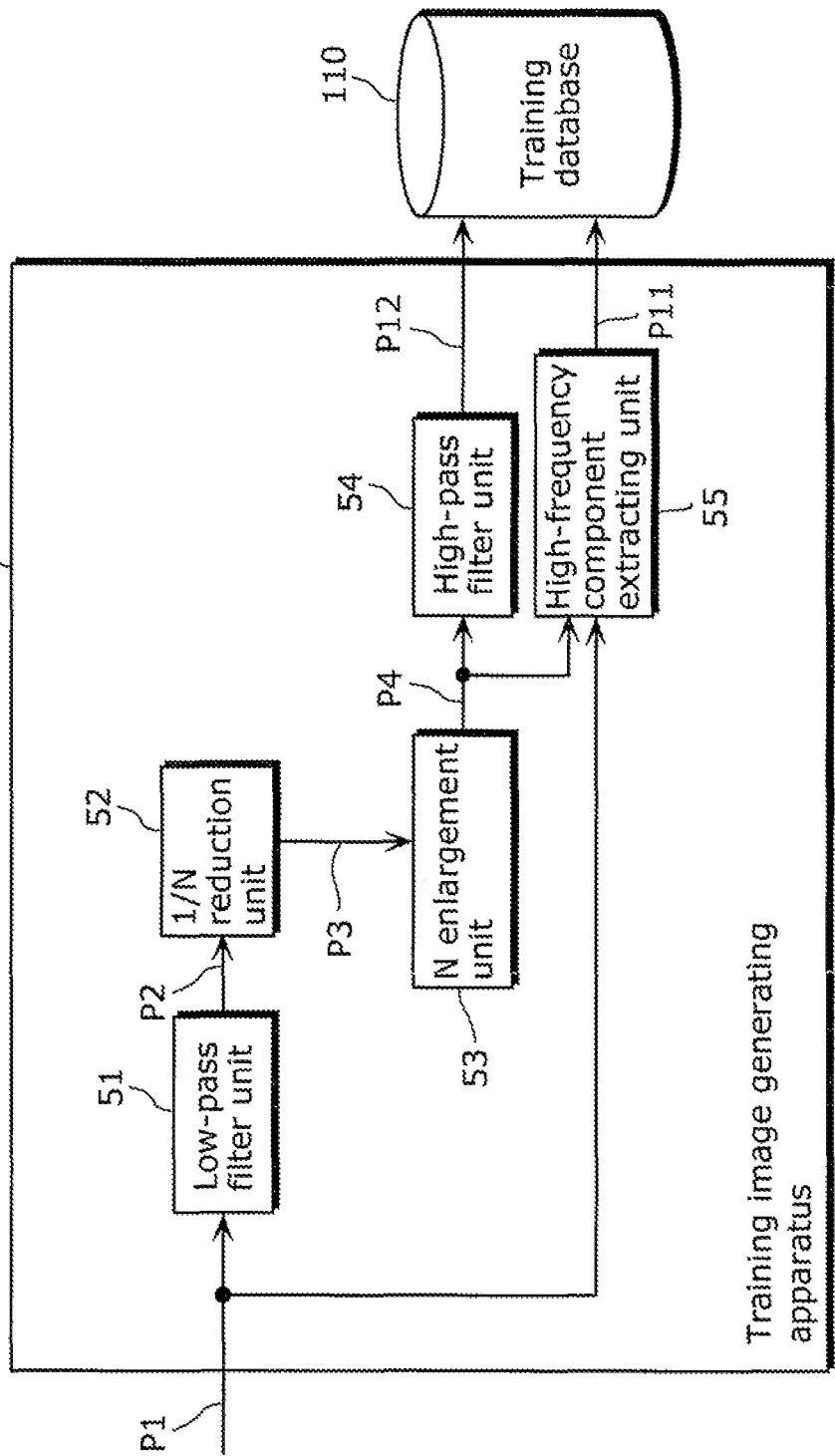
FIG. 3 is a block diagram illustrating a configuration of a training image generating apparatus.

FIG. 3 is a block diagram illustrating a configuration of the training image generating apparatus 50. FIG. 3 also illustrates the training database 110 included in the image processor 100 for describing the training image generating apparatus 50. The training image generating apparatus 50 generates the training high-frequency images P11 and the training medium-frequency images P12, using each of training images P1 captured in advance by, for example, a digital camera. The training image generating apparatus 50 processes several hundred training images P1, for example.

As illustrated in FIG. 3, the training image generating apparatus 50 includes a low-pass filter unit 51, a 1/N reduction unit 52, an N enlargement unit 53, a high-pass filter unit 54, and a high-frequency component extracting unit 55.

The high-frequency component extracting unit 55 extracts a difference between the training image P1 and a training low-frequency image P4 that is transmitted from the N enlargement unit 53 and is to be described later, as a high-frequency component of the training image P1, and partitions an image including the high-frequency components into blocks of a predetermined size. Then, the high-frequency component extracting unit 55 stores each of the resulting blocks in the training database 110 as the training high-frequency image P11.

The high-frequency component extracting unit 55 may extract a high-frequency component of the training image P1 by linear filtering and others.

Furthermore, the low-pass filter unit 51 extracts a low-frequency component of the training image P1 as a training low-frequency image P2 by linear filtering and others.

The 1/N reduction unit 52 reduces the training low-frequency image P2 to 1/N in each of the horizontal and vertical directions to generate a training low-frequency image P3.

The N enlargement unit 53 enlarges the training low-resolution image P3 by a factor N in each of the horizontal and vertical directions to generate the training low-frequency image P4. The N enlargement unit 53 transmits the training low-frequency image P4 to the high-pass filter unit 54 and the high-frequency component extracting unit 55.

The high-pass filter unit 54 extracts a high-frequency component from the training low-frequency image P4 by linear filtering and others, and partitions an image of the high-frequency component into blocks of a fixed size. Then, the high-pass filter unit 54 stores each of the resulting blocks in the training database 110 as the training medium-frequency image P12.

The training image generating apparatus 50 may generate the training medium-frequency image P12 through processes performed by the low-pass filter unit 51 and the high-pass filter unit 54, without using the 1/N reduction unit 52 and the N enlargement unit 53.

The size of the training high-frequency image P11 is the same as that of the training medium-frequency image P12. Each of the training high-frequency image P11 and the training medium-frequency image P12 has, for example, a size of horizontal 18×vertical 18 pixels.

Here, each of the high-pass filter unit 54 and the high-frequency component extracting unit 55 stores, in the training database 110, the training image pair P10 in which the training high-frequency image P11 and the training medium-frequency image P12 that correspond to a block at the same coordinates (position) in the same training image P1 are associated with each other.

The process of storing the training image pair P10 in the training database 110 is performed on all of the target training images P1, so that K training image pairs P10 are stored in the training database 110. K is, for example, 100,000. In other words, for example, 100,000 training image pairs P10 are stored in the training database 110.

Here, the training high-frequency image P11 and the training medium-frequency image P12 corresponding to each of the training image pairs P10 are images corresponding to a block at the same coordinates (position) in the same training image P1.

With the processes, a lot of kinds of training image pairs P10 are stored in the training database 110.

The training high-frequency image P11 is a synthesized data item 171 to be described later, and is a training data item for generating an output image of a high resolution. In other words, the training database 110 stores K pairs of training data items in which the K first training data items (training high-frequency images P11) each obtained from a high-frequency component of the training image P1 are respectively associated with the K second training data items (training medium-frequency images P12) obtained at least from a low-frequency component of the training image P1.

The image enlargement unit 120 generates a temporary enlarged image 121 by enlarging the input image 101. The input image 101 is an image whose resolution is to be converted. The input image 101 has, for example, a size of horizontal 1920 pixels×vertical 1080 pixels. The size of the input image 101 is not limited to the size of horizontal 1920 pixels×vertical 1080 pixels, and the input image 101 may have, for example, a size of horizontal 1440 pixels×vertical 1080 pixels.

The feature data extracting unit 130 extracts first feature data 131 from the temporary enlarged image 121. The training data search unit 140 calculates a similarity between the first feature data 131 and each of the K training medium-frequency images P12 stored in the training database 110. The details will be described later.

The training medium-frequency image P12 will be also referred to as the second feature data or a second training data item hereinafter. Furthermore, the training high-frequency image P11 associated with the training medium-frequency image P12 in the training database 110 in FIG. 2 will be also referred to as the third feature data or a first training data item hereinafter.

Then, the training data search unit 140 selects the training high-frequency images P11 (first training data items) respectively corresponding to the training medium-frequency images P12, based on the calculated similarities.

The edge strength calculating unit 150 extracts fourth feature data from the input image 101, and calculates an edge strength EN based on the fourth feature data. The details will be described later. The edge strength EN indicates the strength of an edge (measure of the strength). More specifically, the edge strength EN indicates whether a target block has strong properties as one of an edge region, a texture region, and a flat region.

The composite number calculating unit 160 calculates, based on the edge strength EN, a composite number GN of the training high-frequency image P11 to be synthesized, from among the selected training high-frequency images P11 (first training data items). The details will be described later.

The synthesizing unit 170 generates the synthesized data item 171 using the training high-frequency image P11 having the composite number GN, from among the selected training high-frequency images P11 (first training data items). The details will be described later.

The addition unit 180 adds the synthesized data item 171 to the temporary enlarged image 121 per block to generate the output image 102.

According to the conventional technique disclosed in Patent Reference (Japanese Unexamined Patent Application Publication No. 2003-018398), only one training data item having the highest similarity is selected from a training database. In contrast, the first training data items are selected according to Embodiment 1. Then, the count of the first training data items to be synthesized from among the first training data items is changed according to the edge strength obtained from an input image.

Next, processes for generating a high-resolution image (hereinafter referred to as high-resolution image generation processes) performed by the image processor 100 will be described. The high-resolution image generation processes are an image processing method according to Embodiment 1.

Figure 4:
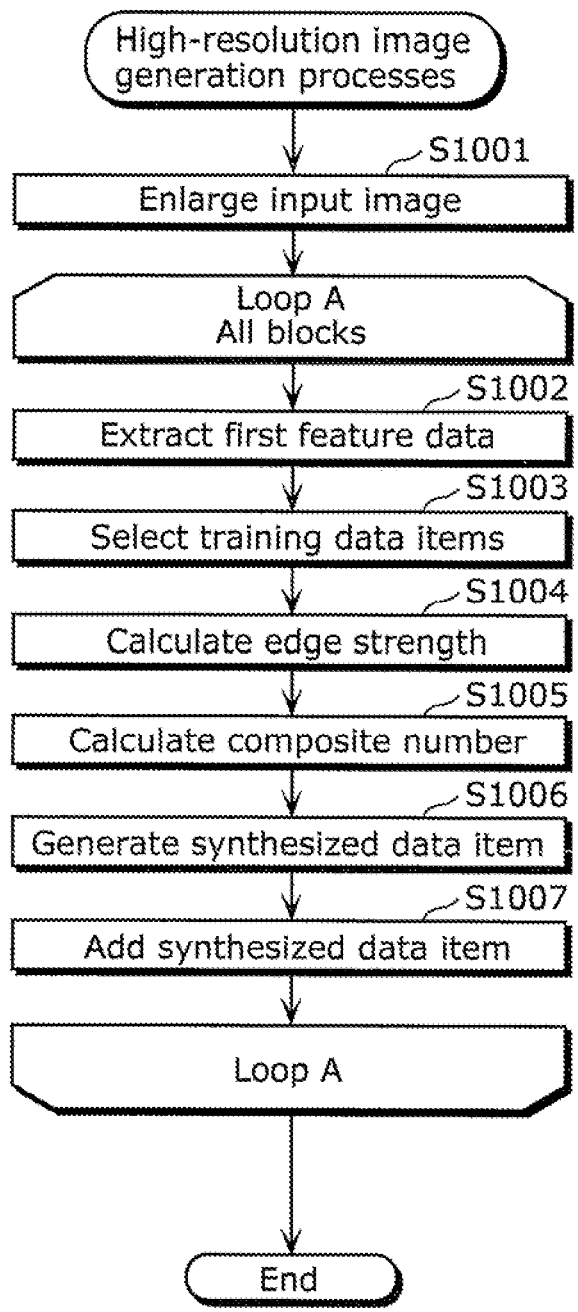
FIG. 4 is a flowchart of the procedure of high-resolution image generation processes according to Embodiment 1 in the present invention.

FIG. 4 is a flowchart of the procedure of the high-resolution image generation processes according to Embodiment 1. Assumed herein is that the input image 101 is a still image.

The image processor 100 converts the input image into a high-resolution image using an image stored in the training database 110.

Figure 5:
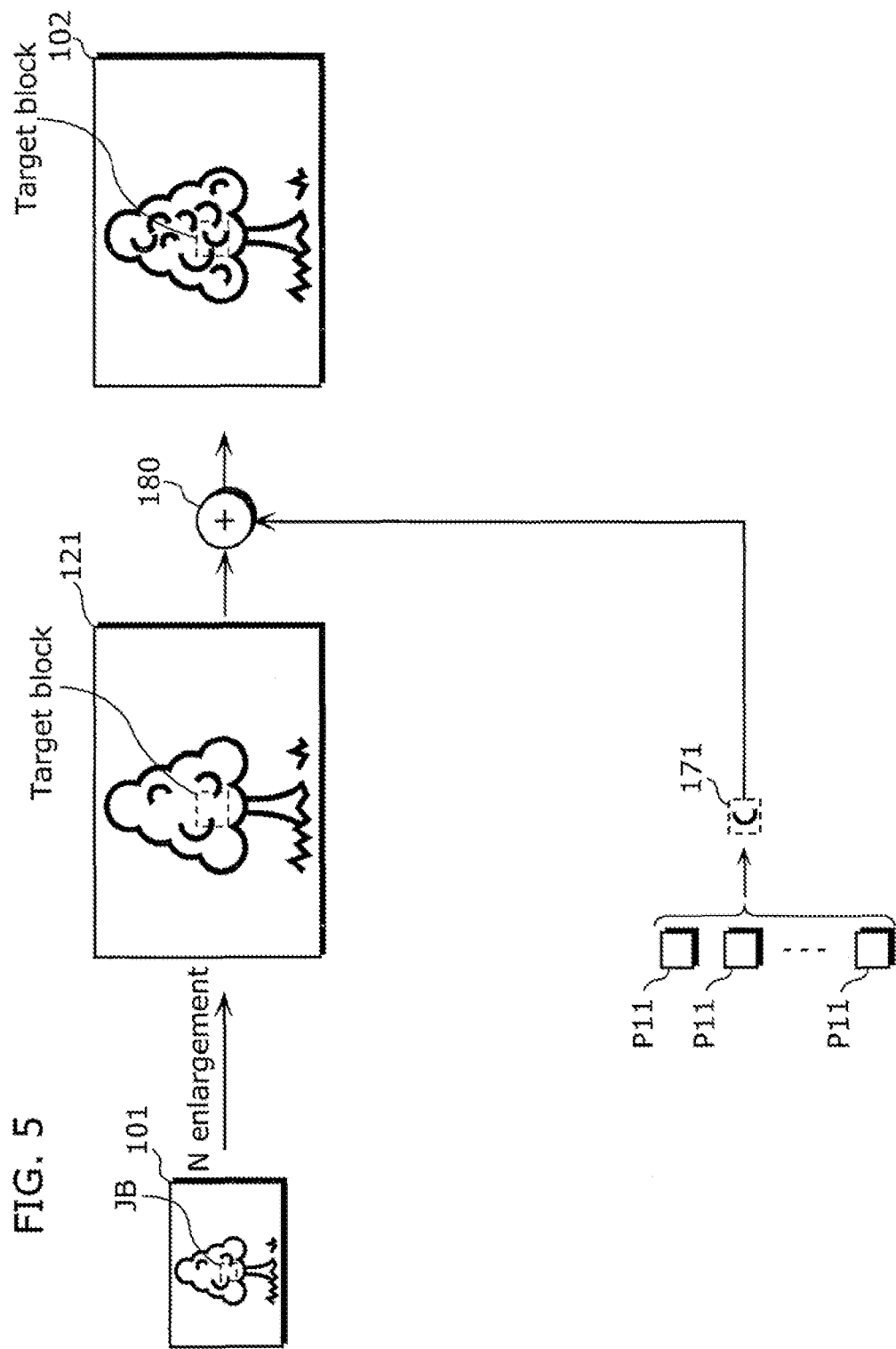
FIG. 5 schematically illustrates a method of generating a high-resolution image.

At Step S1001, the image enlargement unit 120 enlarges the input image 101 by a factor N in each of the horizontal and vertical directions to generate the temporary enlarged image 121 as illustrated in FIG. 5, where N is a real number larger than 1. The process of enlarging the input image 101 uses bicubic interpolation. Embodiment 1 assumes that the input image 101 is enlarged by a factor of 2 in each of the horizontal and vertical directions, for example.

In other words, Step S1001 is a step of enlarging the input image 101 to generate an enlarged image (temporary enlarged image 121).

The technique for enlarging the input image 101 is not limited to the bicubic interpolation, and a pixel interpolation method such as spline interpolation may be used. Furthermore, enlargement factors in the horizontal and vertical directions may be different from each other. For example, when an image of 720×480 pixels are enlarged to an image of 1920× 1080 pixels, the enlargement factor in the horizontal direction is different from the enlargement factor in the vertical direction.

The process of enlarging an image is not limited to enlarging the image larger than the input image 101. For example, the input image 101 may be enlarged by a factor N that is equal to or smaller than 1.

Figure 6:
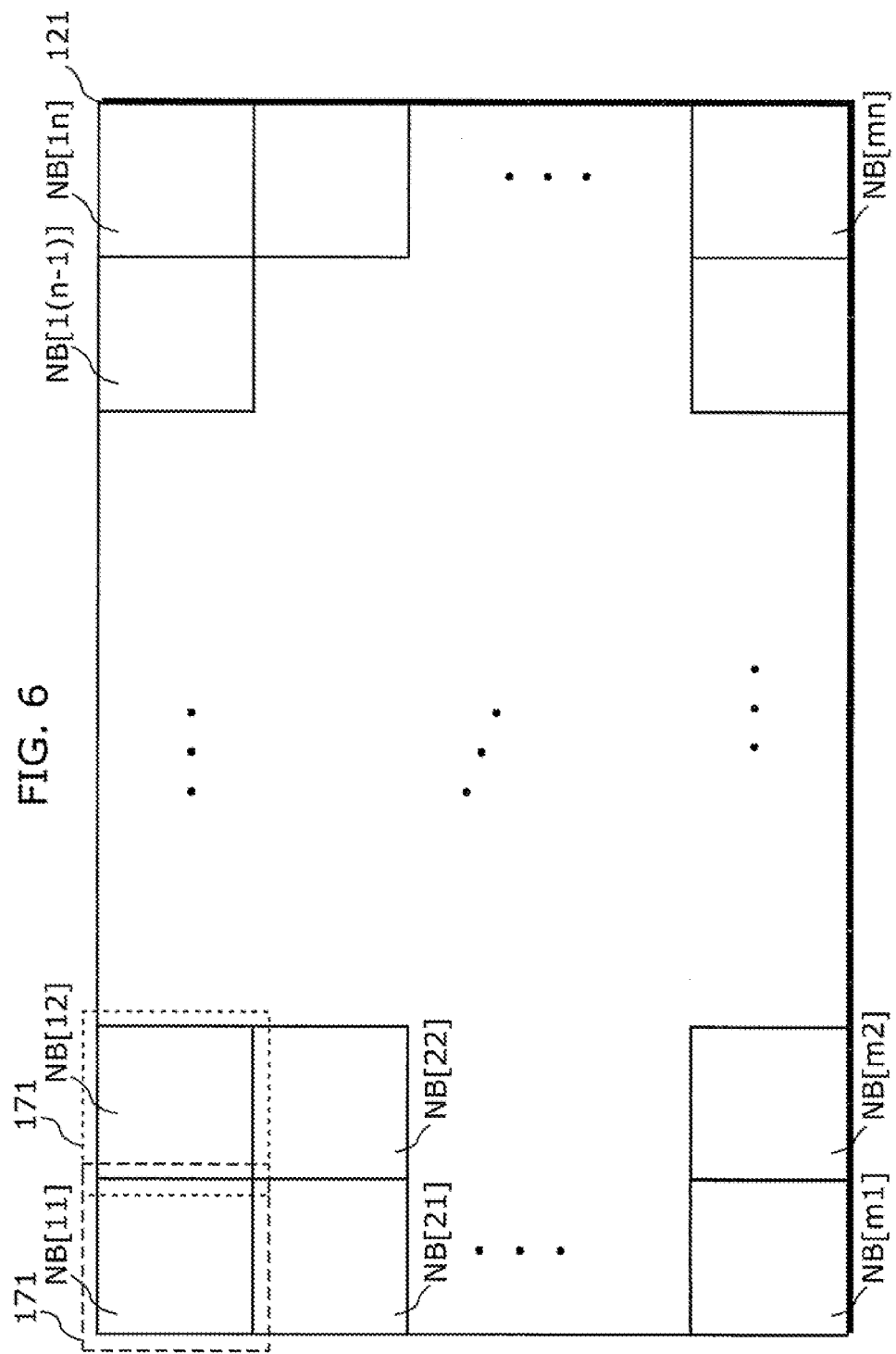
FIG. 6 illustrates a temporary enlarged image partitioned into blocks.

As illustrated in FIG. 6, the temporary enlarged image 121 is partitioned into blocks NB. The blocks NB are a matrix of m rows and n columns. Hereinafter, the block NB at the m-th row and the n-th column in the temporary enlarged image 121 will be denoted as a block NB [mn]. For example, the block NB at the first row and the second column in the temporary enlarged image 121 will be denoted as a block NB [12].

The block NB is smaller than the training high-frequency image P11. The block NB has, for example, a size of horizontal 16 pixels×vertical 16 pixels.

Here, the block NB is not limited to be smaller than the training high-frequency image P11. The block NB may be as large as the training high-frequency image P11.

Hereinafter, the target block to be processed among the blocks NB in the temporary enlarged image 121 will be referred to as a target block.

Processes from Steps S1002 to S1007 are performed on each block NB in the temporary enlarged image 121. The target block is changed to a different block NB each time the processes from Steps S1002 to S1007 are performed.

At Step S1002, the feature data extracting unit 130 extracts first feature data from the target block. More specifically, the feature data extracting unit 130 extracts a medium-frequency component by high-pass filtering the target block in the temporary enlarged image 121 using linear filtering and others, and extracts an image of the medium-frequency component as the first feature data 131. In other words, the first feature data 131 is an image of a medium-frequency component that has been high-pass filtered, from among frequency components of the target block. In other words, the first feature data 131 is an image of a medium-frequency component of the target block. In this case, the first feature data 131 indicates pixel values.

Here, the medium-frequency component corresponding to the first feature data 131 includes a frequency band overlapping with a frequency component corresponding to the second feature data (training medium-frequency image P12).

The first feature data 131 is data to be used for searching in the training database 110.

The target block to be processed at Step S1002 is not limited to the target block included in the temporary enlarged image 121. For example, the target block to be processed at Step S1002 may be a target block included in the input image 101.

Furthermore, the first feature data is not limited to data obtained using a high-pass filter. The first feature data may be, for example, luminance, chrominance, and RGB values indicated by the target block. Furthermore, the first feature data may be, for example, moment (average, variance, kurtosis, skewness) obtained from the target block.

Furthermore, the first feature data may be, for example, a feature value obtained from a co-occurrence matrix (homogeneity, heterogeneity, contrast, average, standard deviation, angular second moment, entropy). Furthermore, the first feature data may be, for example, a principal component obtained by the principal component analysis and a principal component obtained by the independent component analysis.

Here, the first feature data is a representative example in Embodiment 1, and is not limited to this.

At Step S1003, the training data search unit 140 calculates a similarity between the first feature data 131 and each of the K training medium-frequency images P12 (second training data items) stored in the training database 110. The similarity is calculated by calculating, for example, a sum of absolute differences (Manhattan distance) between pixel values indicated by the first feature data 131 and pixel values indicated by each of the training medium-frequency images P12. As the sum of absolute differences is smaller, a similarity between the first feature data 131 and the training medium-frequency image P12 is higher. Here, the similarity may be calculated using the difference square sum (the Euclidean distance).

Then, the training data search unit 140 selects top L training medium-frequency images P12 (second training data items) having the higher similarity to the first feature data 131, based on the calculated similarities, where L is an integer equal to or larger than 2. L is an integer that satisfies a relational expression of $2 \leq L \leq K$. L is also a predetermined constant. In Embodiment 1, L is assumed to be 32, for example.

The selected L training medium-frequency images P12 include a training medium-frequency image P12 having the highest similarity to the first feature data 131. In other words, L similarities respectively corresponding to the selected L training medium-frequency images P12 are top L similarities ranked in descending order of corresponding values from among all the similarities calculated at Step S1003.

Then, the training data search unit 140 selects L training high-frequency images P11 (first training data items) respectively corresponding to the L training medium-frequency images P12 (second training data items), from among the K training high-frequency images P11 (first training data items) stored in the training database 110. In other words, the training data search unit 140 selects the L first training data items which respectively correspond to the L second training data items having the higher similarities to the first feature data indicating a feature of the target block in the temporary enlarged image 121, from among the K first training data items stored in the training database 110.

Then, the training data search unit 140 transmits the selected L training medium-frequency images P11 to the synthesizing unit 170.

In other words, at Step S1003, the training data search unit 140 calculates a similarity between the first feature data 131 and each of the K second training data items, and selects the L first training data items which respectively correspond to the top L second training data items having the higher similarities to the first feature data 131.

Figure 7:
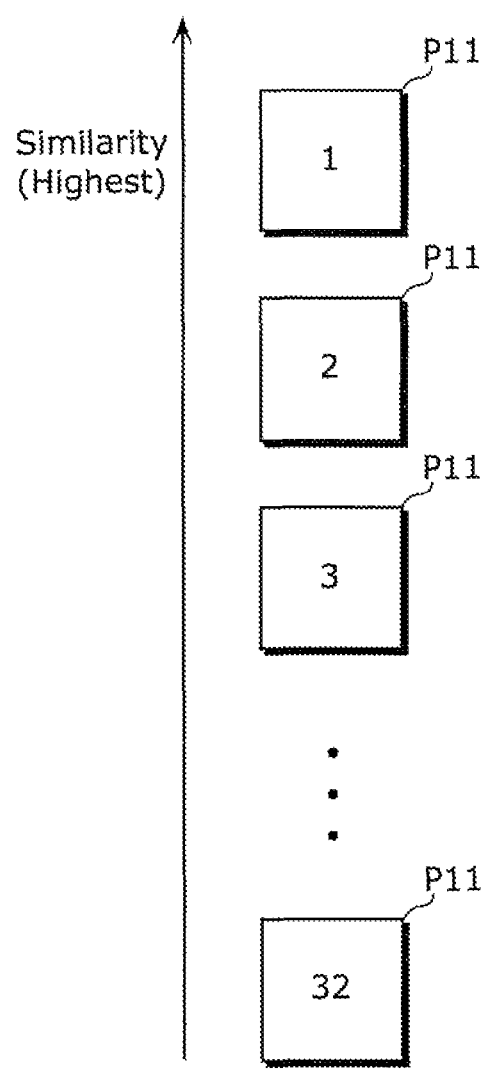
FIG. 7 illustrates selected training high-frequency images.

FIG. 7 illustrates the selected L training high-frequency images P11. In FIG. 7, L is 32.

In FIG. 7, the vertical axis represents the similarity. The numeric character in the training high-frequency image P11 indicates a rank of the similarity between the first feature data 131 and the training medium-frequency image P12 corresponding to the training high-frequency image P11.

For example, the training high-frequency image P11 indicating "1" shows the highest similarity between the first feature data 131 and the training medium-frequency image P12 corresponding to the training high-frequency image P11, among the calculated similarities. In other words, the training high-frequency image P11 indicating "1" is an image having the highest similarity to the training high-frequency image P11 among the calculated similarities.

Furthermore, for example, the training high-frequency image P11 indicating "32" shows the 32nd highest similarity between the first feature data 131 and the training medium-frequency image P12 corresponding to the training high-frequency image P11, among all the similarities. In other words, the training high-frequency image P11 indicating "32" is an image having the 32nd highest similarity of the training high-frequency image P11 among the calculated similarities.

Here, the first training data item (third feature data) is not limited to the training high-frequency image P11 indicating the high-frequency component extracted using a high-pass filter. The first training data item may be, for example, luminance, chrominance, or RGB values of the training image P1.

Here, the second training data item is not limited to the training medium-frequency image P12 indicating the medium-frequency component extracted using a low-pass filter and a high-pass filter.

The second training data item may be, for example, luminance, chrominance, or RGB values of the training image P1. Furthermore, the second training data item may be, for example, moment (average, variance, kurtosis, skewness) obtained from the training image P1.

Furthermore, the second training data item may be, for example, a feature value obtained from a co-occurrence matrix (homogeneity, heterogeneity, contrast, average, standard deviation, angular second moment, entropy). Furthermore, the second training data item may be, for example, a principal component obtained by the principal component analysis and a principal component obtained by the independent component analysis.

At Step S1004, the edge strength calculating unit 150 extracts fourth feature data from a block JB corresponding to the target block in the input image 101. The details will be described later. As illustrated in FIG. 5, a relative position of the block JB in the input image 101 is equal to a relative position of the target block in the temporary enlarged image 121.

Then, the edge strength calculating unit 150 calculates the edge strength EN based on the fourth feature data. The edge strength EN indicates whether the target block has strong properties as one of an edge region, a texture region, and a flat region.

Assumed herein is that the fourth feature data is, for example, an output value obtained using a first derivative Sobel filter. Hereinafter, the output value obtained using the first derivative Sobel filter will also be referred to as a filter output value F4. The edge strength calculating unit 150 calculates the edge strength EN by thresholding the filter output value F4. For the calculation, it is necessary to define criteria for determining a region using the filter output value F4.

A larger filter output value F4 indicates a larger edge strength in the target block. Here, the edge strength calculating unit 150 determines that the target block is an edge region. Furthermore, a smaller filter output value F4 indicates a smaller edge strength in the target block. Here, the edge strength calculating unit 150 determines that the target block is a texture region.

Furthermore, when the filter output value F4 is very small, the edge strength calculating unit 150 determines that the target block is a flat region. Here, the target block may be excluded as a block whose resolution is to be increased.

More specifically, the edge strength calculating unit 150 filters the block JB using the Sobel filter. The output value obtained by filtering using the Sobel filter is the filter output value F4.

Since the filtering using the Sobel filter is a known process, it will not be described in detail.

Here, the threshold to be used for calculating the edge strength EN using the filter output value F4 will be described hereinafter.

Figure 8:
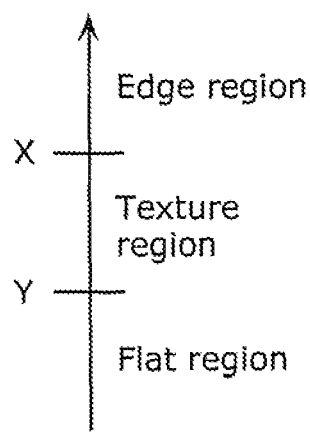
FIG. 8 illustrates thresholds to be used for calculating an edge strength.

FIG. 8 illustrates the threshold to be used for calculating the edge strength EN. Thresholds X and Y are used for calculating the edge strength EN using the filter output value F4. Here, X is larger than Y.

The edge strength calculating unit 150 determines that the block JB (target block) is an edge region when the filter output value F4 is equal to or larger than X. Here, the edge strength calculating unit 150 determines the edge strength EN=1. The edge strength calculating unit 150 determines that the block JB (target block) is a flat region when the filter output value F4 is equal to or smaller than Y. Here, the edge strength calculating unit 150 determines the edge strength EN=0.

The edge strength calculating unit 150 determines that the block JB (target block) is a texture region when the filter output value F4 is between X and Y. Here, the edge strength calculating unit 150 calculates the edge strength EN using Equation 1 below.

$$\text{Edge strength } EN = (F4-Y)/(X-Y) \quad \text{(Equation 1)}$$

The first derivative Sobel filter is a feature value indicating that a computation target block has stronger properties as a edge region, as the output value is larger. On the other hand, as an output value of standard deviation obtained from a co-occurrence matrix is larger, the computation target block has stronger properties as a texture region.

Here, the fourth feature data is not limited to the output value obtained using the first derivative Sobel filter, and may be the standard deviation obtained from the co-occurrence matrix.

Here, the fourth feature data is assumed to be a standard deviation F4' obtained from the co-occurrence matrix. In this case, the edge strength calculating unit 150 determines that the block JB (target block) is an edge region when the standard deviation F4' is equal to or smaller than X. In this case, the edge strength calculating unit 150 determines the edge strength EN=1.

The edge strength calculating unit 150 determines that the block JB (target block) is a texture region when the standard deviation F4' is equal to or larger than Y. In this case, the edge strength calculating unit 150 determines the edge strength EN=0.

The edge strength calculating unit 150 calculates the edge strength EN using Equation 2 below, when the standard deviation F4' is between X and Y.

$$\text{Edge strength } EN=(Y-F4')/(Y-X) \quad \text{(Equation 2)}$$

Then, the edge strength calculating unit 150 transmits the calculated edge strength EN to the composite number calculating unit 160.

In other words, at Step S1004, the edge strength calculating unit 150 obtains the edge strength EN by calculating the edge strength EN of a block image that is a part of the input image 101. The target block is an image obtained by enlarging the block image. In other words, at Step S1004, the edge strength calculating unit 150 calculates the edge strength EN of the input image 101 to obtain the edge strength EN. Putting another way, at Step S1004, the edge strength calculating unit 150 calculates the edge strength EN necessary for generating a synthesized image to be used in generating the output image 102 to obtain the edge strength EN.

Hereinbefore described is the method of calculating the edge strength EN when the fourth feature data is (i) an output value obtained using the first derivative Sobel filter or (ii) a standard deviation obtained from a co-occurrence matrix.

Furthermore, the fourth feature data may be one of (i) an output value obtained using a first derivative filter, (ii) an output value obtained using a second derivative filter, and (iii) each feature value obtained from a co-occurrence matrix (homogeneity, heterogeneity, contrast, average, standard deviation, angular second moment, entropy). The fourth feature data is not limited to these.

Furthermore, the definition of the edge strength EN is a representative example in Embodiment 3, and is not limited to this. For example, the edge strength EN may be used as binary data indicating only one of 0 and 1.

When calculating the edge strength EN, the fourth feature data extracted from a target block in the temporary enlarged image 121 may be used instead of the block JB in the input image 101.

At Step S1005, the composite number calculating unit 160 calculates the composite number GN of the training high-frequency image P11 to be synthesized, from among the selected L training high-frequency images P11 (first training data items), based on the edge strength EN calculated by the edge strength calculating unit 150. In other words, the composite number calculating unit 160 calculates, based on the edge strength EN, J that is a count of data items (first training data items) to be used for generating the synthesized image (synthesized data item 171) to be used in generating the output image, where J is an integer equal to or larger than 2.

Here, Max denotes the largest value of the composite number GN, and Min denotes the smallest value of the composite number GN. Max is equal to the aforementioned L. Min is, for example, 2.

Here, the composite number calculating unit 160 calculates the composite number GN using Equation 3 below.

$$\text{The composite number } GN=\text{round}(\text{Min}+(\text{Max}-\text{Min})\times EN) \quad \text{(Equation 3)}$$

In Equation 3, round ( ) is a function for rounding a value to the nearest integer. For example, "round (X)" expresses rounding a value X to the nearest integer. Furthermore, "EN" in Equation 3 denotes the edge strength EN. Here, for example, when a value obtained by "(Min+(Max−Min)× EN)" is 7.5, the calculated composite number GN is 8.

Equation 3 is an equation which increases the composite number GN as the edge strength EN is greater, and decreases the composite number GN as the edge strength EN is smaller.

More specifically, the composite number calculating unit 160 calculates the composite number GN by substituting the calculated edge strength EN into Equation 3. In other words, the composite number calculating unit 160 calculates a larger J as the edge strength EN is greater, and a smaller J as the edge strength EN is smaller, where J denotes the composite number GN.

Then, the composite number calculating unit 160 notifies the synthesizing unit 170 of the calculated composite number GN.

The method of calculating the composite number GN is not limited to the aforementioned calculation method. The composite number GN may be calculated using, for example, the sum of absolute differences between the first feature data 131 and each of the L training medium-frequency images P12 (second training data items). Here, the composite number GN is the number of second training data items whose sum of absolute differences is smaller than a predetermined threshold.

At Step S1006, the synthesizing unit 170 synthesizes J training high-frequency images P11 (first training data items) from among the selected L training high-frequency images P11 to generate a synthesized image, where J is $2 \leq J \leq L$. In other words, the synthesizing unit 170 generates the synthesized image by synthesizing the J data items.

More specifically, first, the synthesizing unit 170 determines, to be synthesized, top GN training high-frequency images P11 indicating higher similarities from among the selected L training high-frequency images P11 (first training data items).

For example, assume the composite number GN as 5. Here, the synthesizing unit 170 determines, to be synthesized, top five training high-frequency images P11 indicating the higher similarities from among the 32 training high-frequency images P11 in FIG. 7. In this case, the synthesizing unit 170 determines the five training high-frequency images P11 indicating the first to fifth highest similarities to be synthesized.

Then, the synthesizing unit 170 generates the synthesized image item 171 by synthesizing the GN training high-frequency images P11. More specifically, the synthesizing unit 170 generates the synthesized image item 171 by calculating an average of GN pixel values respectively corresponding to pixels at the same coordinates in the GN training high-frequency images P11 to be synthesized, as illustrated in FIG. 5.

For example, the synthesizing unit 170 calculates the average of the GN pixel values corresponding to the pixels in the first row and the first column of the GN training high-frequency images P11, as a pixel value of the pixel in the first row and the first column of the synthesized data item 171.

The synthesized data item 171 is a synthesized image as large as the training high-frequency image P11.

The method of generating the synthesized data item 171 is not limited to the aforementioned processes, and may be other methods.

Here, when a target block (image) includes an edge, the training high-frequency image P11 selected (searched) from the training database 110 is assumed to be an error image including noise. In this case, assuming that the temporary enlarged image 121 is added to the error image, artifacts are visible in an edge region to which the error image has been added. In other words, a bumpy edge occurs in the edge region.

By performing the processes at Steps S1005 and S1006, the synthesized data item 171 is generated using the larger count of training high-frequency images P11 as the edge strength EN is greater. Thus, even when the synthesized data item 171 is generated using the training high-frequency image P11 selected as an error image including noise, the synthesized data item 171 is an image in which the artifacts, the bumpy edge, and others are suppressed. In other words, the processes at Steps S1005 and S1006 enable generation of the synthesized data item 171 with high definition and less noise.

In other words, assuming that one data to be synthesized (training high-frequency image P11) indicates noise, the synthesized image (synthesized data item 171) is an image in which noise is suppressed.

Generally, when the strength of an edge in an image is smaller, the image is a texture image. When the synthesized data item 171 for increasing the resolution of the texture image is generated, as the larger count of images are synthesized, the reproducibility of the texture decreases.

By performing the processes at Steps S1005 and S1006, the synthesized data item 171 is generated using the smaller count of training high-frequency images P11 as the edge strength EN is smaller. Thus, the processes at Steps S1005 and S1006 enable generation of the synthesized data item 171 in which decrease in the reproducibility of the texture is prevented.

At Step S1007, as illustrated in FIG. 5, the addition unit 180 adds the synthesized data item 171 as a synthesized image to the block NB (target block) corresponding to the synthesized data item 171, in the temporary enlarged image 121. The synthesized data item 171 is an image of a definition higher than that of the target block.

Hereinafter, the process of adding the synthesized data item will be described by giving one example. Assume that the target block is the block NB [11] in the temporary enlarged image 121 in FIG. 6. Furthermore, assume that the synthesized data item 171 as the synthesized image has a size of horizontal 18 pixels×vertical 18 pixels. In other words, the synthesized data item 171 is larger than the target block.

Here, the synthesizing unit 170 adds pixel values of pixels included in the synthesized data item 171, to pixel values of pixels included in the block NB [11], respectively, so that the center of the synthesized data item 171 matches the center of the block NB [11]. In this case, the pixel value of a pixel in a part of the synthesized data item is added to a pixel value of a pixel in a block adjacent to the block NB [11].

The processes from Steps S1002 to S1007 are performed on all the blocks NB in the temporary enlarged image 121. Thereby, the output image 102 is generated. In other words, with iterations of the process at Step S1007, the addition unit 180 adds the synthesized image (synthesized data item 171) to the temporary enlarged image 121 to generate the output image 102. In other words, the addition unit 180 generates the output image 102 using the synthesized image.

Furthermore, with iterations of the process at Step S1007, the synthesized data items 171 are added to adjacent blocks NB in the temporary enlarged image 121, respectively, so as to overlap with each other as illustrated in FIG. 6. Here, the adjacent blocks NB are, for example, the blocks NB [11] and [12], and blocks NB [21] and [22].

Hereinafter, a region in which parts of the synthesized data items 171 are added to overlap with each other will be also referred to as an overlap region. As such, adding the parts of the synthesized data items 171 to overlap with each other enables suppression of a block noise caused by the addition.

The aforementioned high-resolution image generation processes are processes when the target input image 101 is a still image. When the target input image 101 is a moving image, the high-resolution image generation processes are repeatedly performed for each frame included in the moving image.

As described above, according to Embodiment 1, the synthesized data item 171 is generated, using the larger count of training high-frequency images P11 similar to the first feature data 131 obtained from the target block as the edge strength EN is greater. In other words, assuming that one data to be synthesized (training high-frequency image P11) indicates noise, the synthesized image (synthesized data item 171) is an image in which noise is suppressed. Thus, the synthesized data item 171 with high definition and less noise can be generated. Furthermore, the addition unit 180 adds the synthesized data item 171 with high definition and less noise to the temporary enlarged image 121.

Thereby, the image processor 100 according to Embodiment 1 can generate the output image 102 with high definition and less noise. In other words, the image processor 100 according to Embodiment 1 can suppress image degradation in the output image 102 generated using the synthesized image (synthesized data item 171).

Furthermore, when the input image 101 is a moving image, the image processor 100 according to Embodiment 1 calculates the edge strength EN using the input image 101. Then, the image processor 100 generates the synthesized data item 171 based on the edge strength EN. Thereby, the edge strength EN between frames in the moving image can be calculated with high precision. Thus, the count of the training high-frequency images P11 for generating the synthesized data item 171 becomes appropriate. As a result, it is possible to produce advantages of suppressing flickering of the moving image by the high-resolution image generation processes and generating a high-quality and high-resolution image.

As a result, the image processor 100 according to Embodiment 1 can generate the high-quality and high-resolution image having an edge in an edge region without any bumpy edge and artifacts, and having a high-resolution texture in a texture region.

Modification of Embodiment 1

In order to calculate the edge strength EN, fifth feature data obtained from the training high-frequency images P11 (first training data items) stored in the training database may be used.

Figure 9:
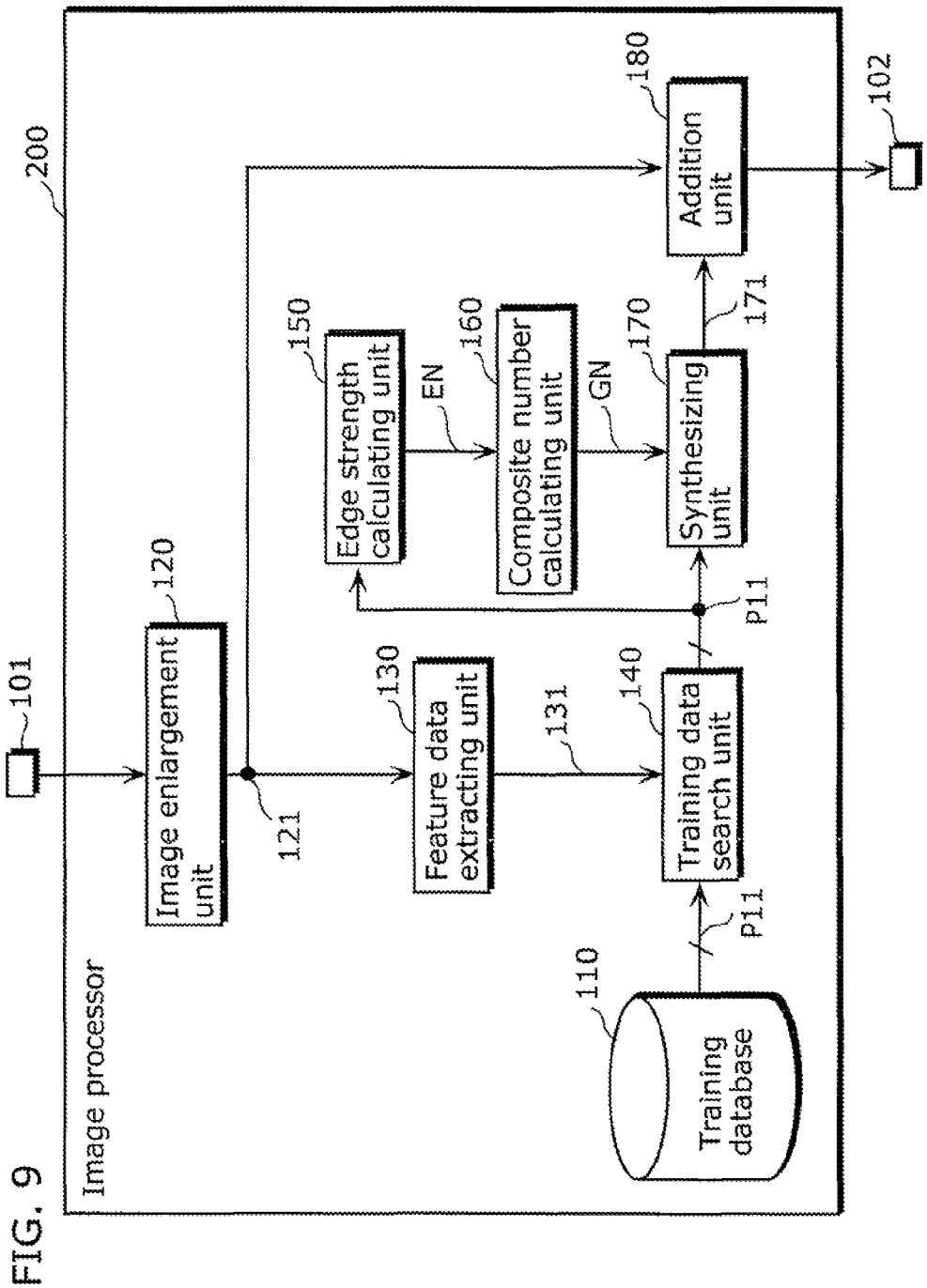
FIG. 9 is a block diagram illustrating a configuration of an image processor according to Modification of Embodiment 1 in the present invention.

FIG. 9 is a block diagram illustrating a configuration of an image processor 200 according to Modification of Embodiment 1.

As illustrated in FIG. 9, the image processor 200 includes the same constituent elements as those of the image processor 100 in FIG. 1. The detailed description of each of the constituent elements is not repeated.

The image processor 200 is mainly different from the image processor 100 in that the edge strength calculating unit 150 calculates the edge strength EN using the training high-frequency images P11 (first training data items), instead of the input image 101. Since the other processes performed by the image processor 200 are the same as those by the image processor 100, the detailed description is not repeated.

The edge region is, for example, a region having a simple structure including only 1 or 2 strong edges in a flat region. The training high-frequency images P11 (first training data items) corresponding to such an edge region tend to be similar to each other. In contrast, the texture region is, for example, a region having a complicated structure in which several weak edges are involved. The training high-frequency images P11

(first training data items) corresponding to such a texture region are less similar to each other than those corresponding to the edge region.

Thus, the density between data items of the training high-frequency images P11 (first training data items) is used as fifth feature data F5 in Modification of Embodiment 1.

Next, processes for generating a high-resolution image (hereinafter referred to as high-resolution image generation processes A) performed by the image processor 200 will be described. The high-resolution image generation processes A are an image processing method according to Modification of Embodiment 1.

Figure 10:
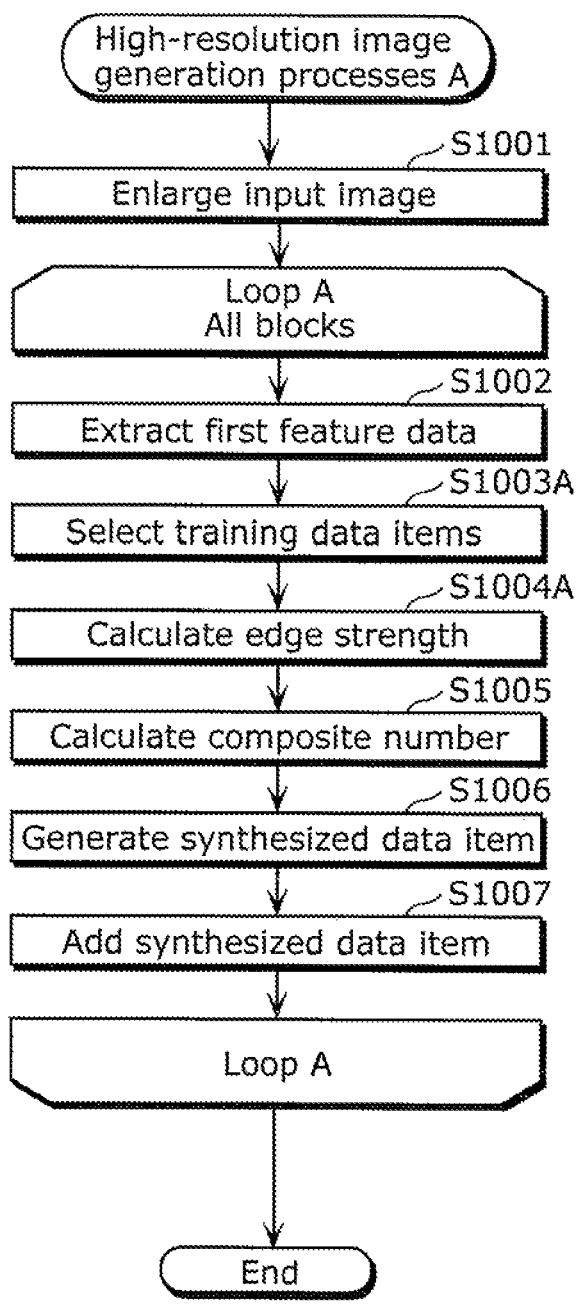
FIG. 10 is a flowchart of the procedure of high-resolution image generation processes A.

FIG. 10 is a flowchart of the procedure of the high-resolution image generation processes A. In FIG. 10, since the processes numbered by the same step numbers indicate that the same processes as those in Embodiment 1 will be performed, the detailed description thereof is not repeated. The high-resolution image generation processes A are different from the high-resolution image generation processes in FIG. 4 by Steps S1003A and S1004A, instead of Steps S1003 and S1004.

The following mainly describes the differences with Embodiment 1.

Since the L training high-frequency images P11 (first training data items) are selected at Step S1003A as at Step S1003, the detailed description thereof is not repeated. Then, the training data search unit 140 transmits the selected L training high-frequency images P11 to the synthesizing unit 170 and the edge strength calculating unit 150.

At Step S1004A, the edge strength calculating unit 150 calculates the density between data items of the L training high-frequency images P11. Here, assume that images L1, L2, L3, . . . , LL denote the L training high-frequency images P11. In this case, the edge strength calculating unit 150 calculates a sum of absolute differences between pixels of the images L1, L2, L3, . . . , LL (hereinafter referred to as absolute difference sum). Thereby, the edge strength calculating unit 150 obtains (L−1) absolute difference sums.

Then, the edge strength calculating unit 150 determines a total or an average of the (L−1) absolute difference sums to be the fifth feature data F5.

Here, as the value of the fifth feature data F5 is larger, the density between the data items of the L training high-frequency images P11 is smaller. In other words, as the value of the fifth feature data F5 is larger, the density between the data items of the L training high-frequency images P11 is smaller. In other words, as the value of the fifth feature data F5 is smaller, the edge strength indicated by the target block is larger.

The method of calculating the fifth feature data F5 is not limited to the aforementioned calculation method. The edge strength calculating unit 150 may calculate the fifth feature data F5 by the following method, for example.

First, the edge strength calculating unit 150 calculates a sum of absolute differences between the target block included in the temporary enlarged image 121 and each of the L training high-frequency images P11.

More specifically, the edge strength calculating unit 150 calculates a sum of absolute differences (hereinafter referred to as absolute difference sum) between pixels of the target block and corresponding pixels of the training high-frequency image P11, for all of the L training high-frequency images P11. Then, the edge strength calculating unit 150 determines a variance or a standard deviation of the calculated L absolute difference sums to be the fifth feature data F5.

Furthermore, the fifth feature data F5 may be a density between data items of the L training medium-frequency images P12 having the higher similarity to the first feature data 131.

For example, the thresholds X and Y in FIG. 8 are used for calculating the edge strength EN using the fifth feature data F5. Here, X is larger than Y.

The edge strength calculating unit 150 calculates the edge strength EN by thresholding the fifth feature data F5. More specifically, the edge strength calculating unit 150 determines that the target block is an edge region when the fifth feature data F5 indicates a value equal to or larger than X. Here, the edge strength calculating unit 150 determines the edge strength EN=1.

The edge strength calculating unit 150 determines that the target block is a flat region when the fifth feature data F5 indicates a value equal to or smaller than Y. Here, the edge strength calculating unit 150 determines the edge strength EN=0.

The edge strength calculating unit 150 calculates the edge strength EN using Equation 4 below, when the fifth feature data F5 indicates a value between X and Y.

$$\text{Edge strength } EN=(F5-Y)/(X-Y) \quad \text{(Equation 4)}$$

The edge strength EN calculated as above is an edge strength of the target block.

Then, the edge strength calculating unit 150 transmits the calculated edge strength EN to the composite number calculating unit 160.

In other words, at Step S1004A, the edge strength calculating unit 150 calculates the edge strength EN based on a value obtained by a difference between the target block and each of the L first training data items (training high-frequency images P11) to obtain the edge strength EN.

The target block at Step S1004A is a block (image) within the temporary enlarged image 121 obtained by enlarging the input image 101. In other words, the target block is an image corresponding to the input image 101.

In other words, at Step S1004A, the edge strength calculating unit 150 calculates the edge strength EN of an image corresponding to the input image 101 to obtain the edge strength EN. Putting another way, at Step S1004A, the edge strength calculating unit 150 calculates the edge strength EN to be used for generating a synthesized image to be used in generating the output image 102 to obtain the edge strength EN.

The fifth feature data F5 can be calculated with high precision by excluding an extremely large absolute difference sum from among the calculated L absolute difference sums. In other words, the edge strength calculating unit 150 can calculate the edge strength EN with high precision.

As described above, the edge strength EN is calculated using the training high-frequency images P11 (first training data items) stored in the training database according to Modification of Embodiment 1. In other words, the edge strength is calculated using the training high-frequency images P11 that are candidates to be actually synthesized. Thus, Modification of Embodiment 1 enables generation of the synthesized data item 171 that matches the feature of the training high-frequency image P11 with higher precision than that using the block JB of the input image 101 according to Embodiment 1. Thus, Modification of Embodiment 1 produces advantages of generating the high-resolution output image 102 with higher definition and less noise than that according to Embodiment 1.

Furthermore, Modification of Embodiment 1 also produces the same advantages as those of Embodiment 1. In other words, the image processor 200 can suppress image degradation in the output image 102 generated using the synthesized image (synthesized data item 171).

Embodiment 2

Next, operations of an image processor 300 according to Embodiment 2 in the present invention will be described.

Figure 11:
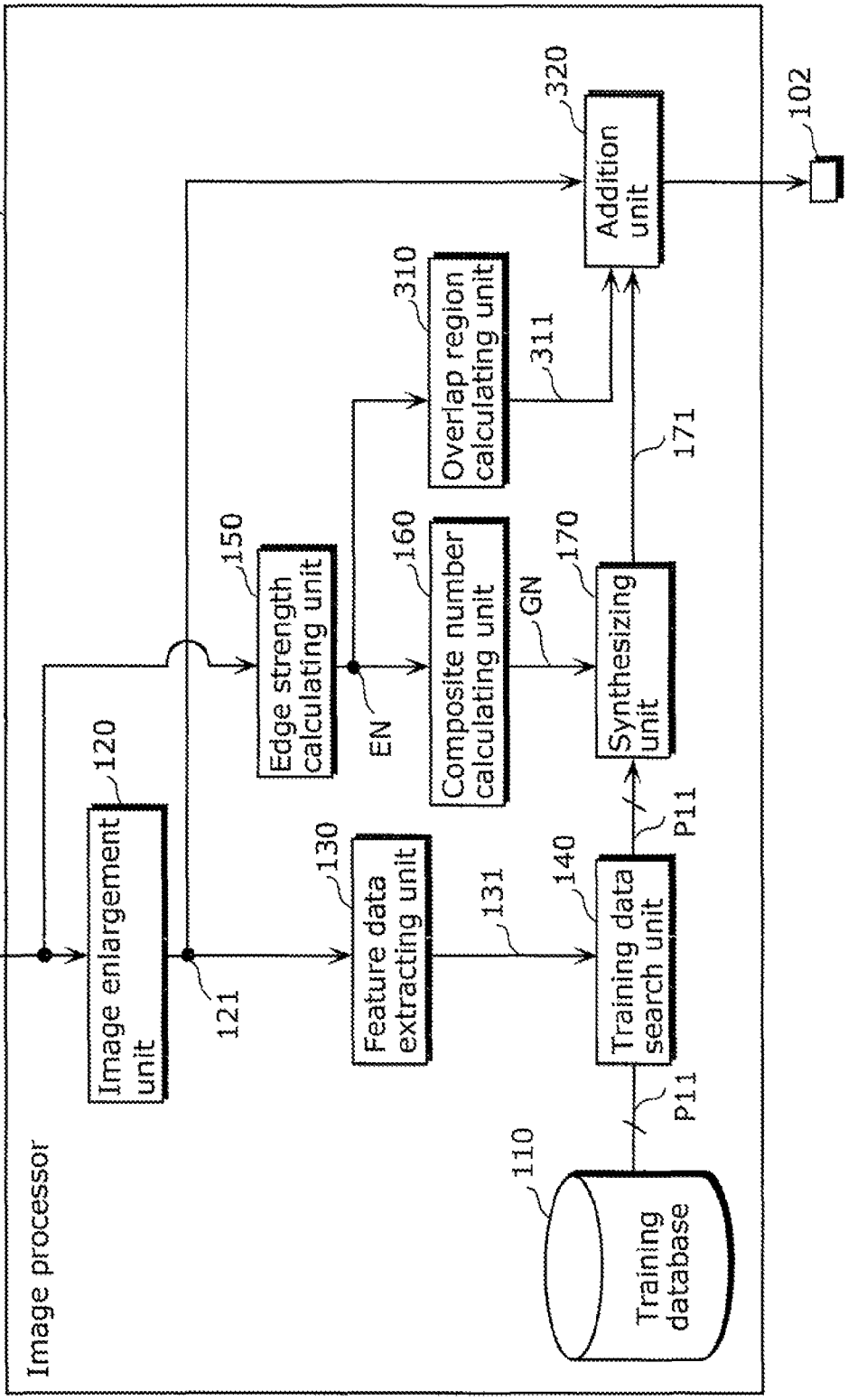
FIG. 11 is a block diagram illustrating a configuration of an image processor according to Embodiment 2 in the present invention.

FIG. 11 is a block diagram illustrating a configuration of the image processor 300 according to Embodiment 2.

As illustrated in FIG. 11, the image processor 300 is different from the image processor 100 in FIG. 1 by including an addition unit 320 instead of the addition unit 180 and further including an overlap region calculating unit 310. Since the other constituent elements of the image processor 300 are the same as those of the image processor 100, the detailed description is not repeated.

Among the constituent elements of the image processor 300, the description of the same constituent elements as those of the image processor 100 according to Embodiment 1 is omitted, and the overlap region calculating unit 310 and the addition unit 320 that are the differences will be described hereinafter.

According to Embodiment 2, an overlap-region process is performed between adjacent blocks. The overlap region calculating unit 310 in FIG. 11 calculates an overlap region 322 between adjacent blocks. The details will be described later. Here, the overlap region 322 is a region within the temporary enlarged image 121, in which synthesized images overlap and are added to each other.

The addition unit 320 calculates a weighted sum of the synthesized data item 171 and the temporary enlarged image 121, based on the overlap region 322. The details will be described later.

According to Embodiment 2, each of the training data items (training high-frequency images P11 and training medium-frequency images P12) stored in the training database 110 is larger than the target block. The target block is a block to be processed among the blocks NB in the temporary enlarged image 121 as described above. The target block according to Embodiment 2 may be referred to as a target block 321.

Figure 12:
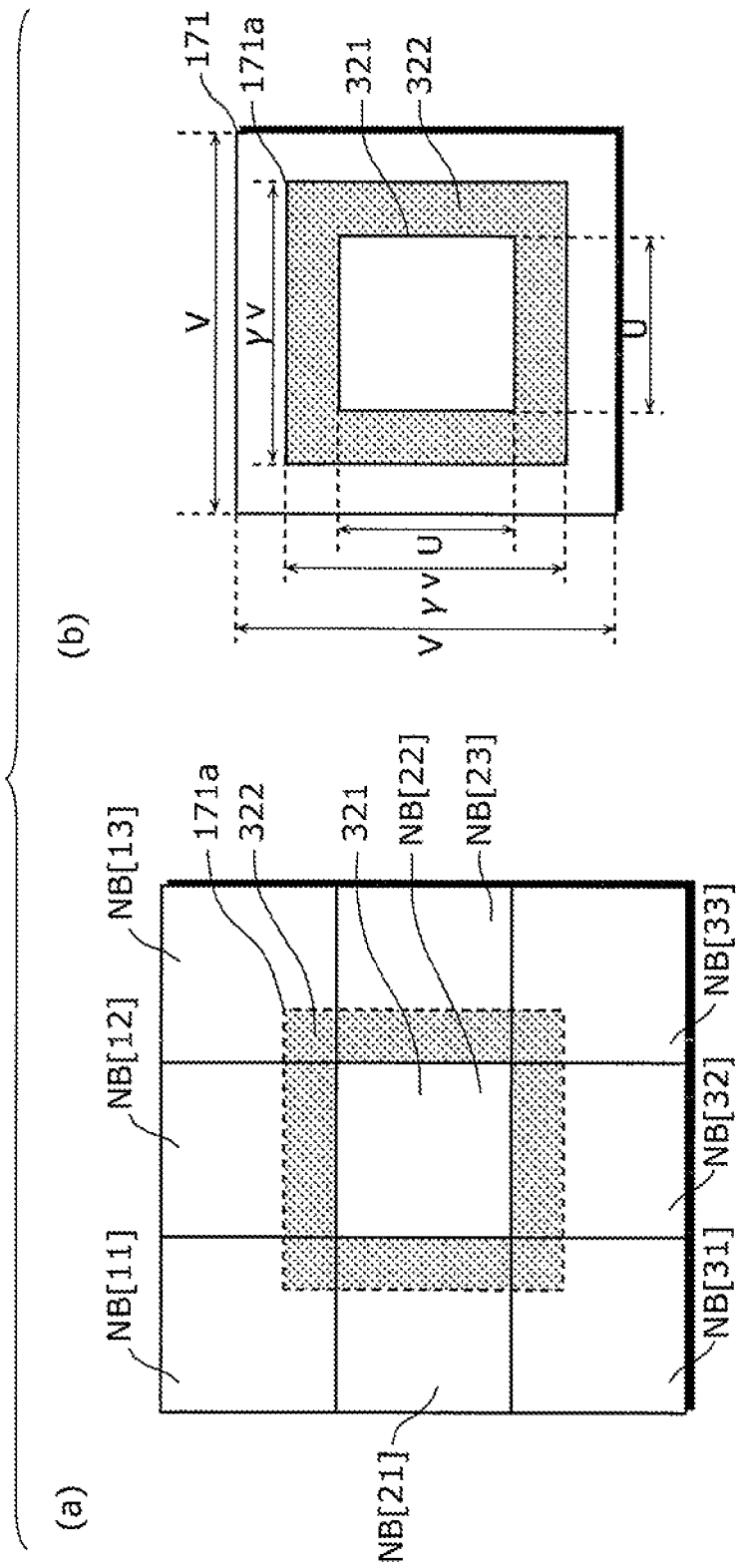
FIG. 12 illustrates an overlap region.

FIG. 12 illustrates an overlap region. In order to describe the overlap region, (a) in FIG. 12 illustrates 9 blocks NB among the blocks NB in FIG. 6. Assume that the 9 blocks NB are, for example, the blocks NB [11], [12], [13], [21], [22], [23], [31], [32], and [33].

Furthermore, (b) in FIG. 12 illustrates the size of each of the blocks NB.

In the following description, assume that the target block 321 has a size of horizontal U pixels×vertical U pixels as illustrated in (b) in FIG. 12, where U is an integer equal to or larger than 2. Furthermore, assume that each of the synthesized data items 171 and the training data items (training high-frequency images P11 and training medium-frequency images P12) has a size of horizontal V pixels×vertical V pixels, where V is an integer equal to or larger than 3 and V>U. In other words, the synthesized image is larger than the target block.

The size of the overlap region 322 is assumed to be the outer boundary of the overlap region 322. The overlap region 322 has a size of horizontal $\gamma V$ pixels×vertical $\gamma V$ pixels, where $\gamma V \geq U$.

A synthesized data item to be added to the temporary enlarged image 121 from among the synthesized data items 171 generated at Step S1006 is also referred to as an addition target synthesized data item 171a. The overlap region 322 is as large as the addition target synthesized data item 171a. The addition target synthesized data item 171a has the size of horizontal $\gamma V$ pixels×vertical $\gamma V$ pixels.

The overlap region 322 has a width of w pixels, where w is equal to or larger than 1. The width of the overlap region 322 is calculated using an equation of, for example, (($\gamma V$−size of one side of the target block)/2).

For example, when w=2, an image with a width of two pixels corresponding to the periphery of the addition target synthesized data item 171a is added to each adjacent block of the target block 321.

Here, assume the target block 321 as the block NB [22] in (a) of FIG. 12. In this case, the adjacent blocks of the target block 321 are the blocks NB [11], [12], [13], [21], [23], [31], [32], and [33].

Next, processes for generating a high-resolution image (hereinafter referred to as high-resolution image generation processes B) performed by the image processor 300 will be described. The high-resolution image generation processes are an image processing method according to Embodiment 2.

Figure 13:
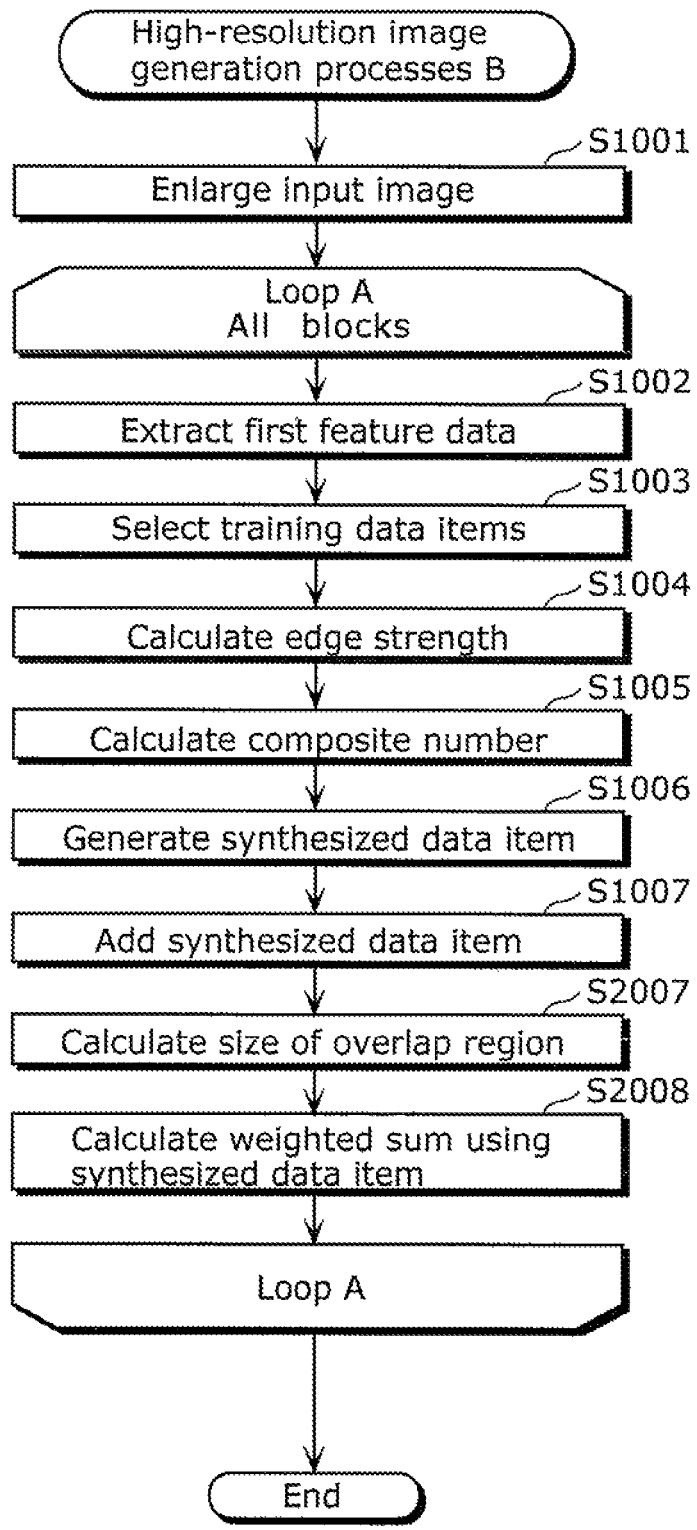
FIG. 13 is a flowchart of the procedure of high-resolution image generation processes B.

FIG. 13 is a flowchart of the procedure of the high-resolution image generation processes B. In FIG. 13, since the processes numbered by the same step numbers indicate that the same processes as those in Embodiment 1 will be performed, the detailed description thereof is not repeated. Thus, Steps S2007 and S2008 in FIG. 13 will be mainly described.

At Steps S1001 and S1006, the same processes as those in Embodiment 1 will be performed.

At Step S2007, the overlap region calculating unit 310 calculates the size of the overlap region 322 between the blocks NB adjacent to the target block, based on the edge strength EN. The calculation of the size of the overlap region 322 is equivalent to calculation of $\gamma V$. In other words, $\gamma V$ denotes the size of the overlap region (hereinafter also referred to as a region size).

The overlap region 322 is larger than the target block 321 in the addition target synthesized data item 171a for the synthesized data item 171 as illustrated in (a) and (b) of FIG. 12.

Similar to the control on the composite number GN according to Embodiment 1, as the target block 321 has stronger properties as an edge region, the overlap region is larger according to Embodiment 2. In other words, as the edge strength EN of the target block 321 is greater, the overlap region 322 is larger. Thereby, the edge can be smoothed. Thus, $\gamma$ is increased in proportion to the edge strength EN.

More specifically, the edge strength calculating unit 310 calculates $\gamma V$ by substituting the edge strength EN into Equation 5 below.

$$\gamma V = \mathrm{round}(U + (V-U) \times EN) \quad \text{(Equation 5)}$$

U denotes the vertical (horizontal) size of the target block in Equation 5. Furthermore, V denotes the vertical or horizontal size of the synthesized data item 171.

In other words, the edge strength calculating unit 310 calculates $\gamma V$ based on the edge strength EN. The numeral $\gamma V$ denotes the size of an overlap region obtained by synthesizing at least parts of synthesized images. Here, the overlap region is equal to or smaller than the synthesized image (synthesized data item 171) and larger than the target block. In other words, the overlap region calculating unit 310 calculates the region size to be larger as the edge strength EN is greater, and to be smaller as the edge strength EN is smaller.

Here, the calculation method of $\gamma V$ is not limited to Equation 5, and may be other methods. Furthermore, the relationship between $\gamma$ and the edge strength is not limited to the proportional relationship, and may be a relationship based on a n-th derivative where n≧1, or a monotonically increasing function, such as an exponential function.

Then, the overlap region calculating unit 310 transmits an overlap region information item 311 indicating the calculated size γV of the overlap region 322, to the addition unit 320.

The addition unit 320 stores the received overlap region information item 311, in association with the target block 321 corresponding to the overlap region information item 311. Here, assume the target block 321 as the block NB [22] in (a) of FIG. 12, for example.

In this case, the overlap region information item 311 is an information item corresponding to the block NB [22]. The addition unit 320 stores the received overlap region information item 311, in association with the block NB [22] corresponding to the overlap region information item 311.

At Step S2008, the overlap-region process will be performed. In the overlap-region process, the addition unit 320 calculates a weighted sum of the synthesized data item 171 and the temporary enlarged image 121, based on the size γV of the overlap region 322 indicated by the overlap region information item 311. In other words, the addition unit 320 calculates a weighted sum of a synthesized image (addition target synthesized data item 171a) of the region size γV and the temporary enlarged image 121, based on the size (γV). In other words, the addition unit 320 adds, to the temporary enlarged image 121, the synthesized image (addition target synthesized data item 171a) of the calculated region size γV among the synthesized images (synthesized data items 171).

Here, assume the target block 321 as the block NB [22] in (a) of FIG. 12. In this case, the addition unit 320 performs processing using four overlap region information items 311 corresponding to the blocks NB [11], [12], [13], and [21] that are adjacent to the block NB [22]. In other words, in the overlap-region process, processed blocks in a sequential order are used as target blocks.

More specifically, the addition unit 320 generates the addition target synthesized data item 171a by extracting the addition target synthesized data item 171a corresponding to the overlap region 322 of the most immediately calculated size γV, from the generated synthesized data item 171. The overlap region 322 the most immediately calculated has a size, for example, indicated by the overlap region information item 311 corresponding to the block NB [22].

Hereinafter, a region of the addition target synthesized data item 171a within the temporary enlarged image 121 is also referred to as an addition target region. The addition target region has the size of horizontal γV pixels×vertical γV pixels.

Then, the addition unit 320 calculates the count of the addition target synthesized data items 171a to be added to each pixel in the addition target region, according to the size (γV) of the overlap region 322 indicated by each of the four overlap region information items 311 to be processed.

Here, assume the target block 321 has a size of horizontal 16 pixels×vertical 16 pixels. Furthermore, assume that the size (γV) of the overlap region 322 indicated by each of the four overlap region information items 311 corresponding to the blocks NB [11], [12], [13], and [21] is 20, for example.

In this case, the overlap region 322 indicated by each of the four overlap region information items 311 has the width of two pixels, according to the equation of ((γV−size of one side of the target block)/2). Here, the addition unit 320 calculates the count of the addition target synthesized data items 171a to be added to the pixel at the upper left corner with respect to the block NB [22] in (a) of FIG. 12, as 3+1=4. In the expression of (3+1), "3" denotes the count of the addition target synthesized data items 171a corresponding to the three blocks NB [11], [12], and [21]. In the expression of (3+1), "1" denotes the count of the addition target synthesized data items 171a corresponding to the target block. Here, the count of the addition target synthesized data items 171a to be added to a pixel at the center of the block NB [22] is 1.

The addition unit 320 calculates the count of the addition target synthesized data items 171a (hereinafter also referred to as added number) to be added to each pixel in the addition target region, in the same manner as described above.

Then, the addition unit 320 calculates an inverse of the added number to each of the pixels in the addition target region as a weighting factor. Here, each of the pixels in the addition target region is associated with a weighting factor.

The weighting factor is a value in a range of 1/k to 1, where k denotes the count of blocks that is to be used in the overlap-region process and that includes a target block. More specifically, k denotes a value obtained by adding 1 to the number of times the overlap region information item 311 of a corresponding one of the blocks adjacent to the target block 321 is used. In other words, as the added number is larger, the corresponding weighting factor is smaller in each of the pixels in the addition target region. For example, the weighting factor at the upper left corner with respect to the block NB [22] is ¼.

Hereinafter, the pixels in the addition target region which respectively correspond to the pixels included in the addition target synthesized data items 171a will be referred to as addition target pixels.

Then, the addition unit 320 adds, to a pixel value of an addition target pixel, a value obtained by multiplying a weighting factor of the addition target pixel by each pixel value of the pixels included in the addition target synthesized data item 171a. The weighted sum is calculated with the process.

Here, in the overlap-region process at Step S2008, blocks to be used as target blocks are not limited to processed blocks in a sequential order.

For example, in (a) of FIG. 12, the block NB [22] is the target block 321, and may use the overlap information items in adjacent 8 directions. In this case, overlapping of the addition target synthesized data items 171a corresponding to the blocks NB [11], [12], [13], [21], [23], [31], [32], and [33] is considered in the overlap region 322.

Thus, the weighting factors in addition are different for each pixel, and are in a range of ⅑ to 1. Then, after each of the weighting factors is multiplied by each pixel value of the pixels included in the addition target synthesized data item 171a, the weighting factor is added to the temporary enlarged image 121.

As soon as the overlap region information items of all the blocks to be used in the overlap-region process are calculated, each of the weighting factors is defined. Thus, when the adjacent blocks in the 8 directions in (a) of FIG. 12 are used in the overlap-region process, after calculating the overlap region information item 311 of the block NB [33], the weighting factor is added to the addition target synthesized data item 171a corresponding to the block NB [22].

The directions of the adjacent blocks used in the overlap-region process are not limited to the 8 directions. For example, the directions may be 4 directions of the blocks NB [12], [21], [23], and [32] in (a) of FIG. 12. For example, a combination of adjacent blocks may be a combination of (i) a block two blocks away from the block NB [22], and (ii) the adjacent block.

Furthermore, the shape of a region for use in the addition of the addition target synthesized data item 171a is not limited to a square. The shape of the region may be a rectangle obtained by extending the target block size U×U upward and downward or from side to side, or an asymmetric shape obtained by extending the target block size U×U in only one direction.

At Step S2008, simply a pixel value may be added instead of calculation of a weighted sum, as performed at Step S1007 according to Embodiment 1.

The processes from Steps S1002 to S2008 according to Embodiment 2 are repeatedly performed on all the blocks NB in the temporary enlarged image 121, thus resulting in generation of the output image 102.

As described above, the image processor 300 according to Embodiment 2 calculates the edge strength EN using an input image. Thus, Embodiment 2 has the same advantages as those of Embodiment 1. In other words, the output image 102 with high definition and less noise can be generated.

Furthermore, according to Embodiment 2, it is possible to suppress flickering of a moving image even when the input image 101 is the moving image as according to Embodiment 1.

Moreover, compared to Embodiment 1, Embodiment 2 has advantages of achieving a stable image quality without any error and generating a high-quality and high-resolution image, by controlling an overlap region. Furthermore, Embodiment 2 also produces the same advantages as those of Embodiment 1. In other words, image degradation in the output image 102 generated using the synthesized image (addition target synthesized data item 171a) can be suppressed.

Modification of Embodiment 2

In order to calculate the edge strength EN, the fifth feature data obtained from the training high-frequency images P11 (first training data items) may be used as described in Modification of Embodiment 1.

Figure 14:
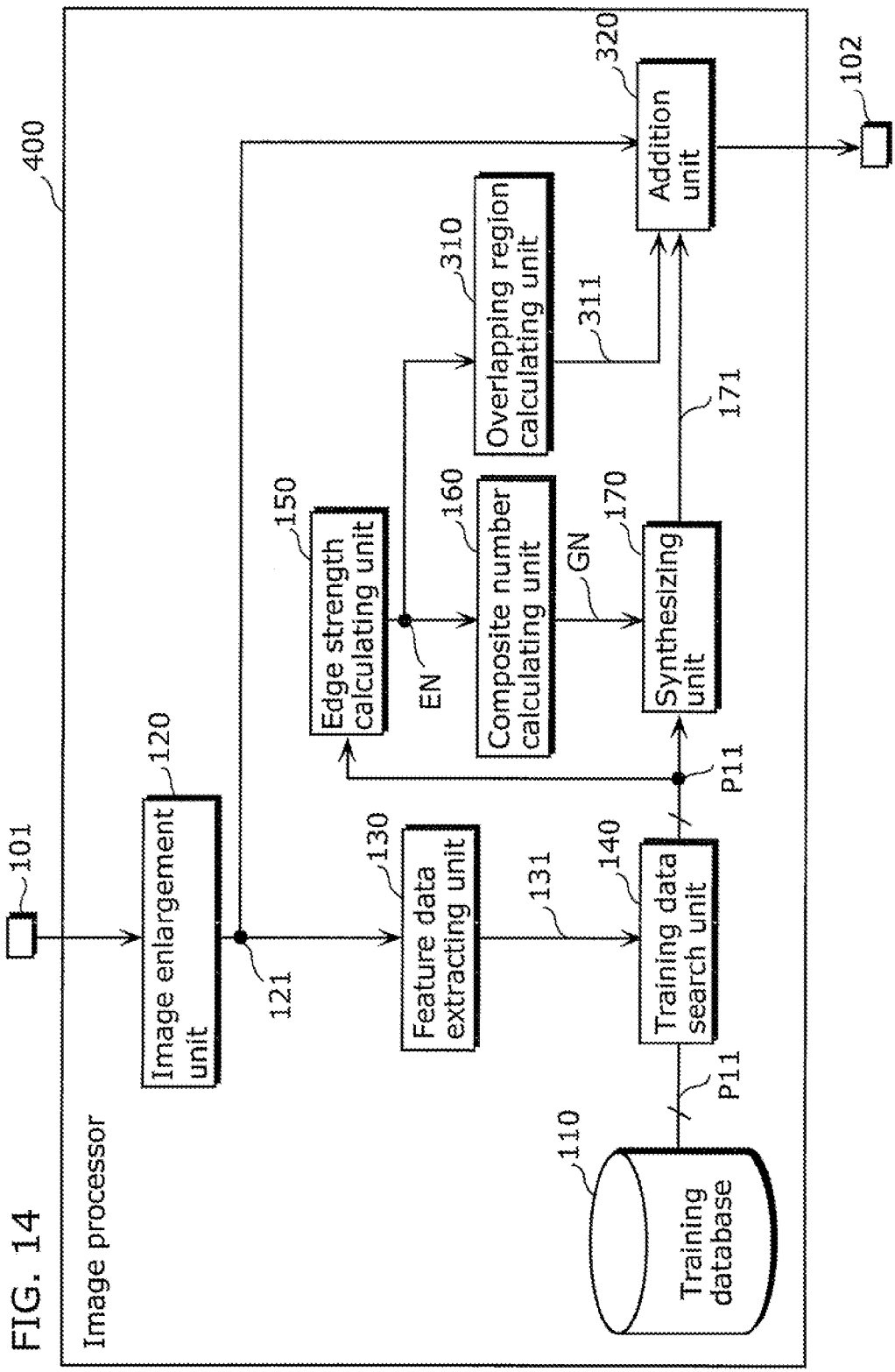
FIG. 14 is a block diagram illustrating a configuration of an image processor according to Modification of Embodiment 2 in the present invention.

FIG. 14 is a block diagram illustrating a configuration of an image processor 400 according to Modification of Embodiment 2.

As illustrated in FIG. 14, the image processor 400 includes the same constituent elements as those of the image processor 300 in FIG. 11. The detailed description of each of the constituent elements is not repeated.

The image processor 400 is mainly different from the image processor 300 in that the edge strength calculating unit 150 calculates the edge strength EN using the training high-frequency images P11 (first training data items), instead of the input image 101. Since other processes performed by the image processor 400 are the same as those by the image processor 300, the detailed description is not repeated.

Since the method of calculating the edge strength EN according to Modification of Embodiment 2 is the same as described in Modification of Embodiment 1, the detailed description is not repeated. Simply put, in the high-resolution image generation processes B of FIG. 13 according to Modification of Embodiment 2, Steps S1003A and S1004A in FIG. 10 are performed, instead of Steps S1003 and S1004.

Modification of Embodiment 2 also produces the same advantages as those of Embodiment 2. In other words, a more stable image quality without any error can be achieved by controlling an overlap region. Furthermore, the edge strength EN is calculated using the training high-frequency images P11 (first training data items) according to Modification of Embodiment 2. In other words, the edge strength is calculated using the training high-frequency images P11 that are candidates to be actually synthesized. Thus, Modification of Embodiment 2 enables generation of a synthesized data item that matches the feature of the training high-frequency images P11 rather than using the input image 101 according to Embodiment 2. Thus, Modification of Embodiment 2 produces an additional advantage of generating a higher-resolution image with higher definition and less noise than that according to Embodiment 2.

Embodiment 3

Next, operations of an image processor 500 according to Embodiment 3 in the present invention will be described.

Figure 15:
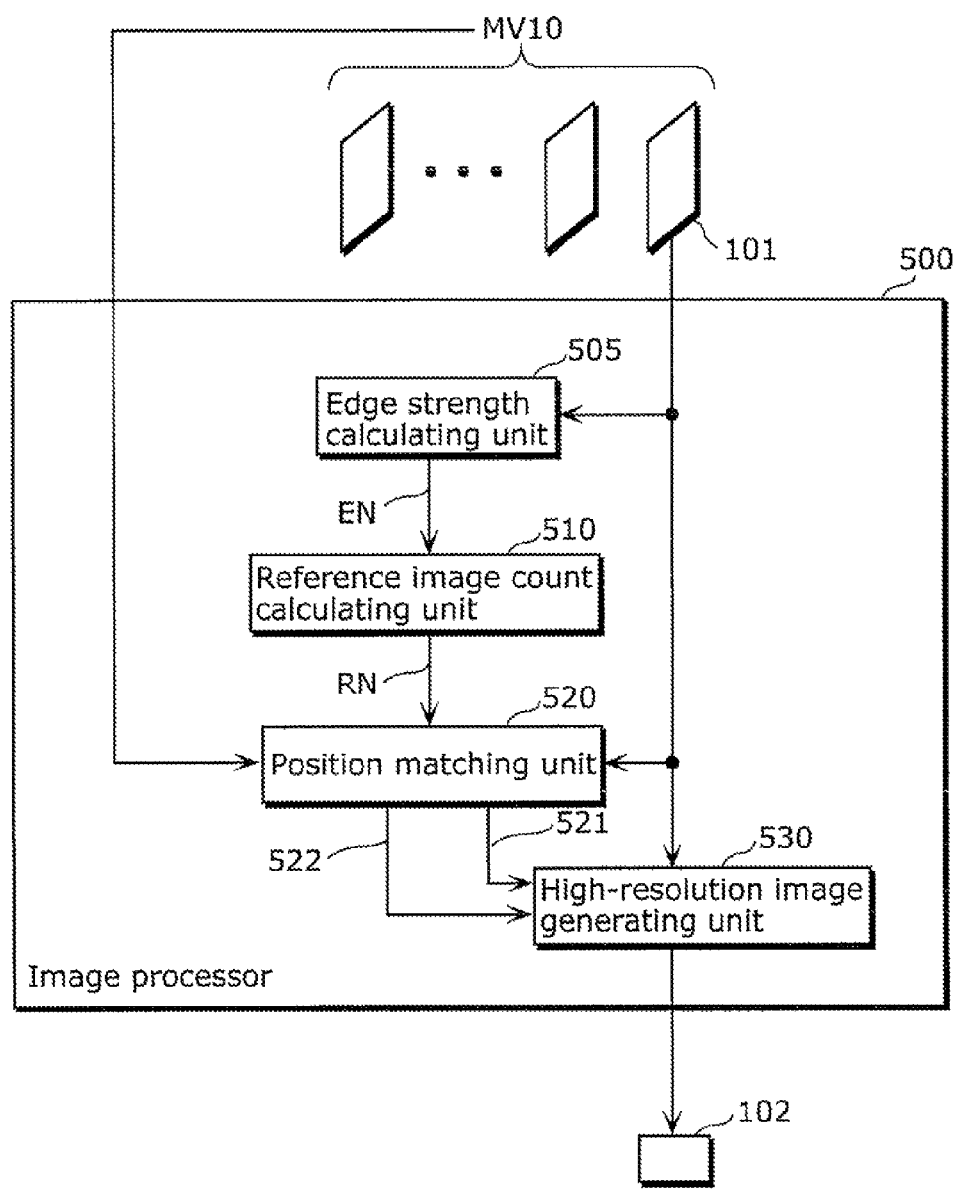
FIG. 15 is a block diagram illustrating a configuration of an image processor according to Embodiment 3 in the present invention.

FIG. 15 is a block diagram illustrating a configuration of the image processor 500 according to Embodiment 3 in the present invention. The image processor 500 generates an output image without using any training data item.

The image processor 500 receives decoded moving images MV10 from, for example, an external decoder that is not illustrated. The moving images MV10 are, for example, moving images decoded according to the H.264/AVC standard. The moving images MV10 are not limited to those according to the H.264/AVC standard, and may be moving images decoded according to the MPEG-2 standard.

The moving images MV10 are assumed to be, for example, moving images corresponding to one Group Of Pictures (GOP). The moving images MV10 are composed of pictures. The image processor 500 receives, for example, a first picture in display order as an input image 101 from among Q pictures composed of the moving images MV10, where Q is an integer equal to or larger than 2. In Embodiment 3, the input image 101 is assumed to be a still image. In Embodiment 3, Q is assumed to be 10, for example.

Although the details will be described later, according to Embodiment 3, low-resolution reference images 501 that are displaced from the input image 101 are matched to the input image 101, and interpolation pixel values are estimated from the position matching information, so as to generate the output image 102.

As illustrated in FIG. 15, the image processor 500 includes an edge strength calculating unit 505, a reference image count calculating unit 510, a position matching unit 520, and a high-resolution image generating unit 530.

The edge strength calculating unit 505 calculates an edge strength EN in the same manner as Embodiment 1. The details will be described later. The reference image count calculating unit 510 increases a count of reference images to be referenced to, as the target block of the input image 101 has stronger properties as an edge region. Furthermore, the reference image count calculating unit 510 decreases the count of reference images, as the target block has stronger properties as a texture region. The count of reference images to be referenced to is also referred to as a reference image count RN hereinafter. The reference image count calculating unit 510 calculates the reference image count RN based on the edge strength EN.

The position matching unit 520 receives the moving images MV10 composed of the Q pictures from, for example, the external decoder that is not illustrated. The position matching unit 520 performs a position matching process. The details will be described later. The position matching unit 520 matches positions of reference images of the reference image count RN to the position of the target block.

Next, processes performed by the image processor 500 (hereinafter referred to as high-resolution image generation processes C) will be described. The high-resolution image generation processes C are an image processing method according to Embodiment 3.

Figure 16:
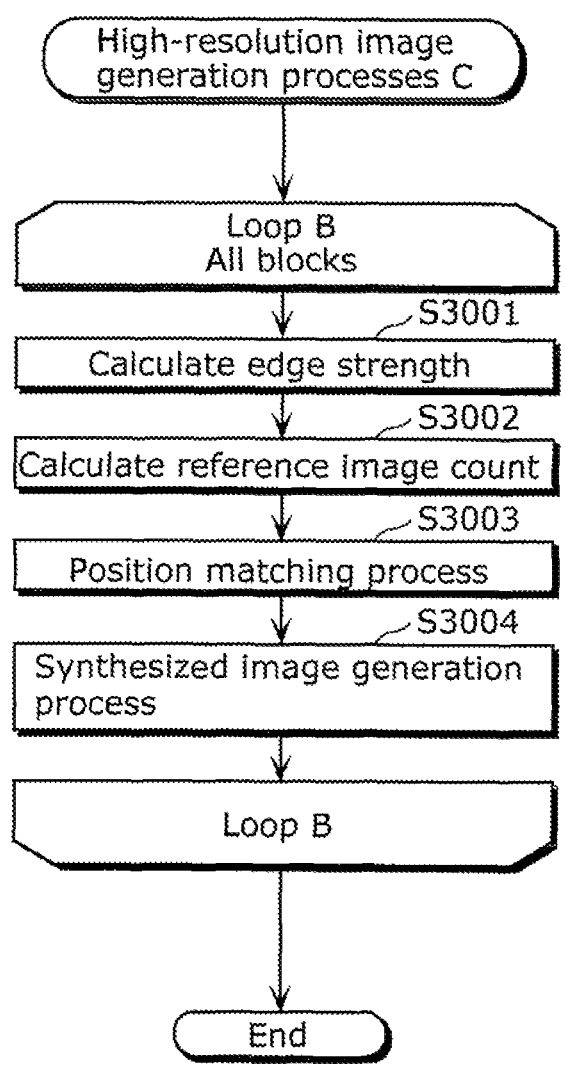
FIG. 16 is a flowchart of the procedure of high-resolution image generation processes C according to Embodiment 3.

FIG. 16 is a flowchart of the procedure of the high-resolution image generation processes according to Embodiment 3.

The input image 101 is partitioned into blocks. Hereinafter, the target block to be processed among blocks included in the input image 101 will also be referred to as a target block PB. The target block PB has, for example, a size of horizontal 8 pixels×vertical 8 pixels.

Since the same process as Step S1004 is performed at S3001, the detailed description thereof is not repeated. The following simply describes Step S3001. First, the edge strength calculating unit 505 extracts fourth feature data from the target block PB in the input image 101. Assumed herein is that the fourth feature data is, for example, an output value obtained using a first derivative Sobel filter.

Then, the edge strength calculating unit 505 calculates the edge strength EN by the same process as Step S1004. Then, the edge strength calculating unit 150 transmits the calculated edge strength EN to the reference image count calculating unit 510.

In other words, at Step S3001, the edge strength calculating unit 505 calculates the edge strength EN of a block image that is a part of the input image. 101 to obtain the edge strength EN. In other words, at Step S3001, the edge strength calculating unit 505 calculates the edge strength EN of the input image 101 to obtain the edge strength EN. Putting another way, at Step S3001, the edge strength calculating unit 505 calculates the edge strength EN necessary for generating a synthesized image to be used in generating the output image 102 to obtain the edge strength EN.

At Step S3002, the reference image count calculating unit 510 calculates the count of pictures to be referenced to from among the received Q pictures, based on the calculated edge strength EN. Hereinafter, the count of pictures to be referenced to from among the received Q pictures is also referred to as the reference image count RN hereinafter. In other words, the reference image count calculating unit 510 calculates J that is the count of reference images (reference image count RN) to be used for generating a synthesized image to be used in generating the output image, based on the edge strength EN.

Here, for example, MaxR denotes the upper limit of the reference image count RN, and MinR denotes the lower limit of the reference image count RN. In this case, the edge strength calculating unit 510 calculates the reference image count RN using the edge strength EN according to Equation 6 below.

$$RN = \text{round}(MinR + (MaxR - MinR) \times EN) \quad \text{(Equation 6)}$$

In Equation 6, round ( ) is a function for rounding a value to the nearest integer as Equation 3.

In other words, the edge strength calculating unit 510 calculates the reference image count RN to be larger as the edge strength EN is greater, and the reference image count RN to be smaller as the edge strength EN is smaller.

Then, the edge strength calculating unit 510 transmits the calculated reference image count RN to the position matching unit 520.

At Steps S3003, the position matching execution process will be performed. In the position matching execution process, the position matching unit 520 performs the position matching process using the target block in the input image 101 and the J (RN) reference images, where J=RN.

More specifically, the position matching unit 520 determines, for example, the first to RN-th pictures in display order from among the Q pictures to be referenced to. In other words, the position matching unit 520 determines the RN pictures from among the Q pictures to be referenced to. Here, RN=5 in the description hereinafter.

Figure 17:
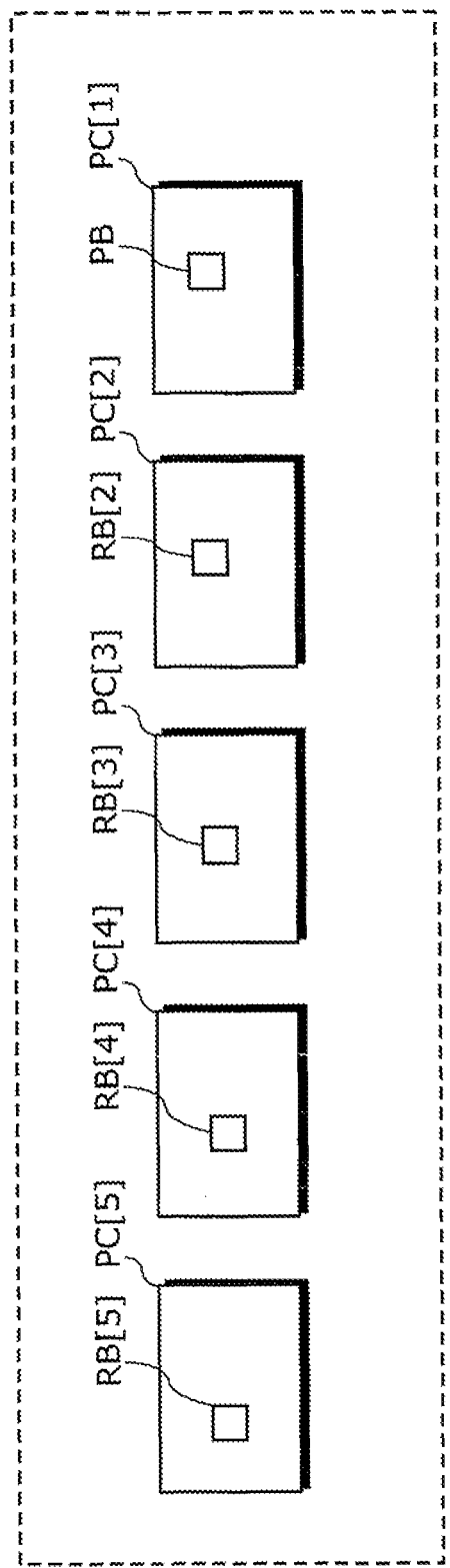
FIG. 17 illustrates a position matching execution process.

FIG. 17 illustrates the position matching execution process.

FIG. 17 exemplifies pictures PC[1], PC[2], PC[3], PC[4], and PC[5]. The pictures PC[1] to PC[5] respectively correspond to the first to fifth pictures.

The picture PC[1] is the input image 101. In the picture PC[1], the target block PB is indicated.

Hereinafter, each of the pictures PC[1], PC[2], PC[3], PC[4], and PC[5] is also simply referred to as a picture PC. A block RB [n] in each picture PC is a reference block similar to the target block PB, where n is an integer. Furthermore, a picture to be referenced to is also referred to as a reference image.

In the position matching execution process, the position matching unit 520 performs the position matching process, using the target block PB and the pictures PC[2], PC[3], PC[4], and PC[5]. Since the position matching process is a known technique as disclosed by, for example, Patent Reference (Japanese Unexamined Patent Application Publication No. 2007-305113), the details will not be described hereinafter.

In the position matching process, for example, coordinates of the block RB [n] in each picture PC are set to coordinates of the target block PB. In other words, the position of the block RB [n] in each picture PC matches the position of the target block PB.

The position matching unit 520 obtains a displacement amount 521 of the block RB [n] with respect to the target block PB in each picture PC, through the position matching process. The displacement amount 521 is represented by, for example, sub-pixel precision precision.

Then, the position matching unit 520 transmits, to the high-resolution image generating unit 530, the displacement amount 521 of each picture PC, and a block image 522 indicated by each of the block RB [n] in each of the pictures PC. Furthermore, the high-resolution image generating unit 530 also receives the target block PB.

At Steps S3004, the synthesized image generation process will be performed. In the synthesized image generation process, the high-resolution image generating unit 530 generates a synthesized image by synthesizing respective blocks of the J (RN) reference images whose positions match that of the target block, based on the displacement amounts obtained from the position matching process.

The synthesized image is an image including pixels of the blocks of the J (RN) reference images whose positions match, at a sub-pixel position of an enlarged block obtained by enlarging the target block PB by a factor of N in each of the vertical and horizontal directions.

In other words, the high-resolution image generating unit 530 estimates a pixel value of interpolated coordinates, using (i) the displacement amount 521 obtained through the position matching process, and (ii) the block image 522 whose position matches that of the target block and which is indicated by a block in the reference image. Here, the interpolated coordinates are coordinates of a sub-pixel in the enlarged block.

Then, the high-resolution image generating unit 530 generates a synthesized image as a high-resolution block (image) by placing pixels of each of the block images 522 whose position matches that of the target block, at the sub-pixel position of the enlarged block.

Since the method of generating a synthesized image as a high-resolution image is a known technique as disclosed by, for example, Patent Reference (Japanese Unexamined Patent Application Publication No. 2007-305113), the details will not be described hereinafter.

The processes from Steps S3001 to S3004 are performed on all the blocks in the input image 101. Thereby, the output image 102 is generated. In other words, with iterations of the process at Step S3004, the high-resolution image generating unit 530 generates the output image 102 using the synthesized image.

The processes from Steps S3001 to S3004 may be performed not only on all the blocks in the input image 101 but also on a block designated in the input image 101.

As described above, the reference image count is controlled according to the properties in the target block according to Embodiment 3. As the edge strength EN is greater, the count of pictures to be referenced to (reference images) is not always fixed but increased. Thereby, Embodiment 3 has an advantage of generating a higher-quality and higher-resolution image than a case of always using the fixed count of reference images, by reducing redundancy in the position matching process.

Embodiment 4

The processing described in each of Embodiments and Modifications can be easily implemented on an independent computer system, by recording a program for realizing the image processing method described in Embodiments and Modifications on a recording medium such as a flexible disk.

Figure 18A:
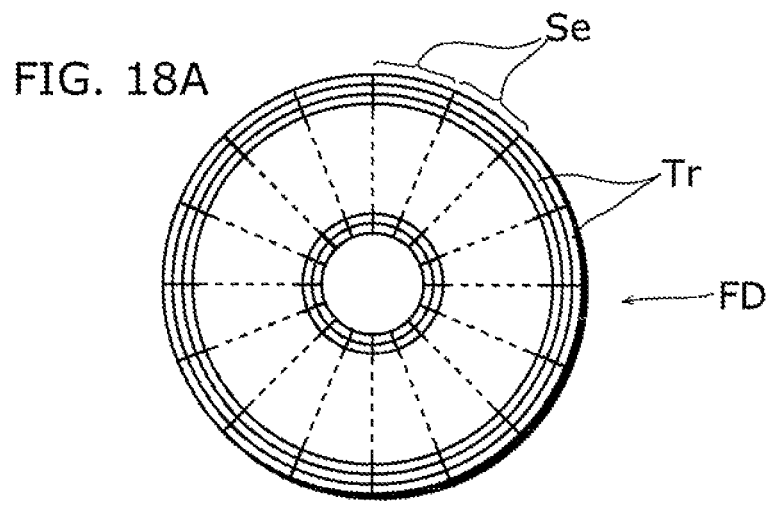
FIG. 18A illustrates an example of a physical format of a recording medium according to Embodiment 4 in the present invention.
Figure 18B:
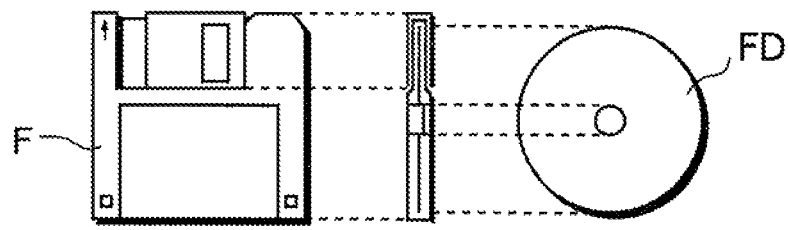
FIG. 18B illustrates a structure of a recording medium according to Embodiment 4 in the present invention.
Figure 18C:
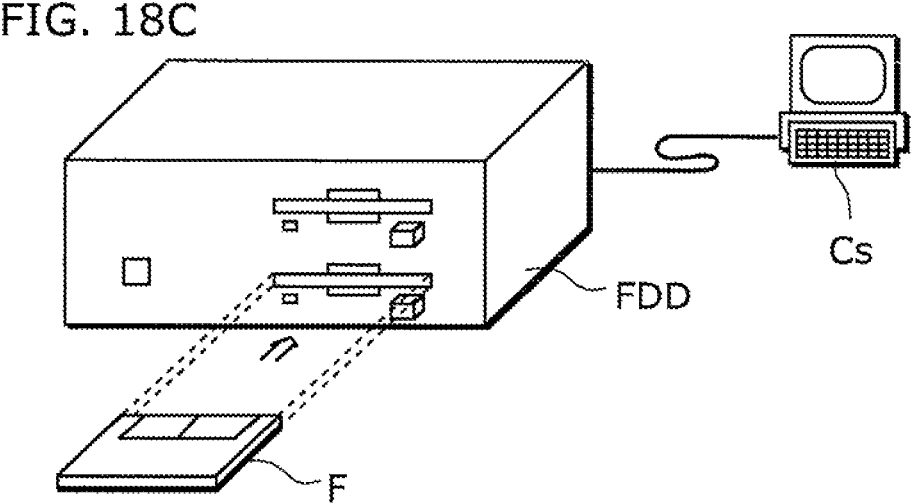
FIG. 18C illustrates a computer system according to Embodiment 4 in the present invention.

FIGS. 18A to 18C are diagrams explaining a case where the image processing method is implemented by a computer system using the program recorded on a recording medium such as a flexible disk.

FIG. 18B illustrates a front appearance of the flexible disk, a cross section of the flexible disk, and the flexible disk. FIG. 18A illustrates an example of a physical format of the flexible disk as the recording medium body. A flexible disk FD is contained in a case F, and tracks Tr are concentrically formed on a surface of the flexible disk FD from outer to inner peripheries. Each track is divided into 16 sectors Se in an angular direction. This being so, in the flexible disk FD storing the above-mentioned program, the program is recorded in an area allocated on the flexible disk FD.

FIG. 18C illustrates a structure of recording and reproducing the program on the flexible disk FD. In the case of recording the program on the flexible disk FD, the program is written from a computer system Cs via a flexible disk drive FDD. In the case of implementing the image processing method on the computer system Cs by the program recorded on the flexible disk FD, the program is read from the flexible disk FD and transferred to the computer system Cs via the flexible disk drive FDD.

Although the above describes an example of using the flexible disk as the recording medium, an optical disc may equally be used. Moreover, the recording medium is not limited to such, and any recording medium such as an IC card and a ROM cassette is applicable so long as the program can be recorded.

Embodiment 5

Figure 19:
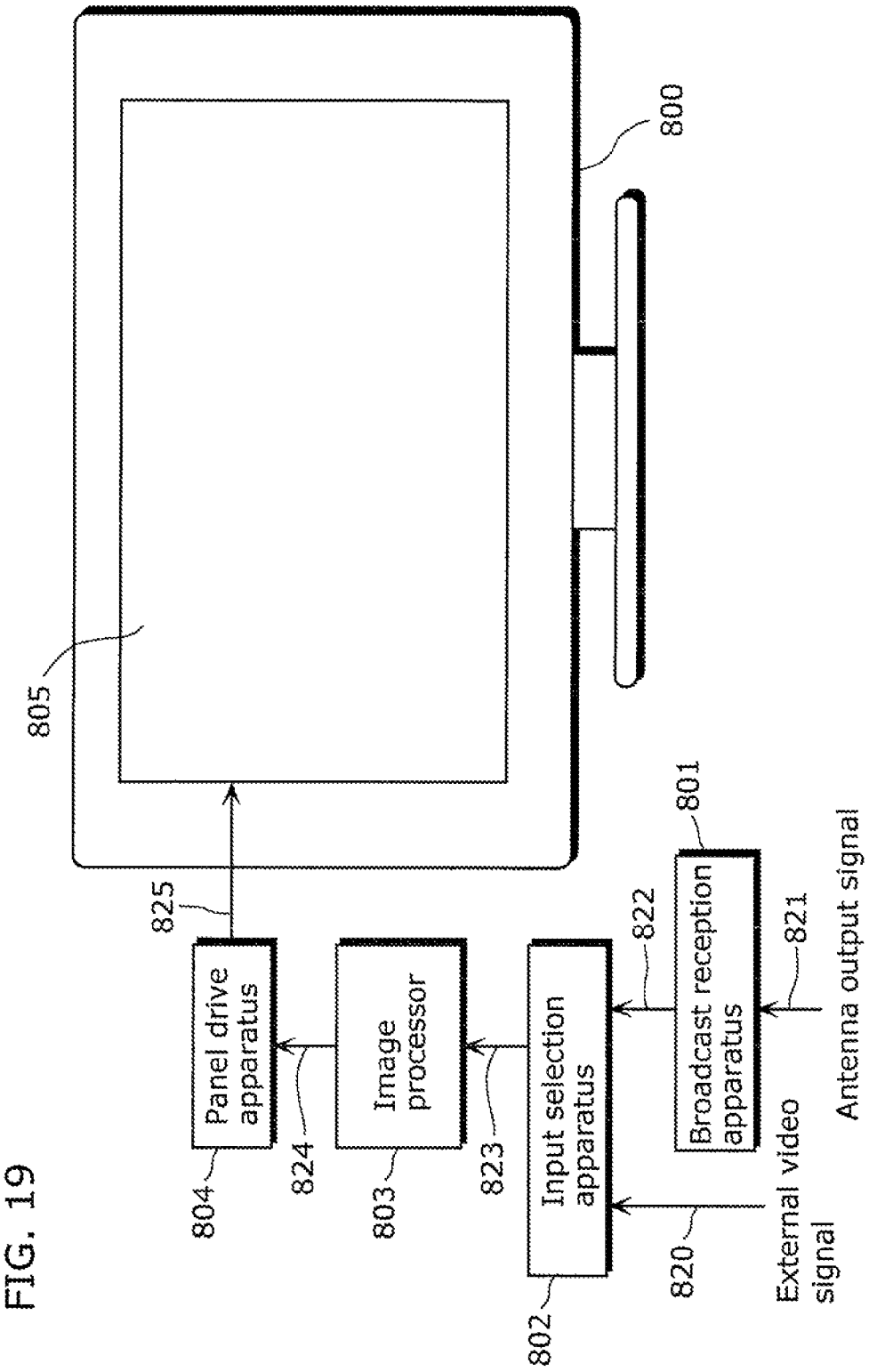
FIG. 19 is a block diagram of a television receiver according to Embodiment 5 in the present invention.

In Embodiment 5 of the present invention, a television receiver 800 using an image processor, an image processing method, and an image processing program is described with reference to FIG. 19.

The television receiver 800 includes a broadcast reception apparatus 801, an input selection apparatus 802, an image processor 803, a panel drive apparatus 804, and a display panel 805. Although the apparatuses 801 to 804 are located outside the television receiver 800 in FIG. 19 for illustration purposes, the apparatuses 801 to 804 are actually located inside the television receiver 800.

The image processor 803 corresponds to one of the image processors 100, 200, 300, 400, and 500.

The broadcast reception apparatus 801 receives a broadcast wave from an antenna output signal 821 outputted from an external antenna (not illustrated), and outputs a video signal obtained by demodulating the broadcast wave, as a broadcast video signal 822.

The input selection apparatus 802 selects one of the broadcast video signal 822 and an external video signal 820 that is outputted from an external video appliance such as a DVD or BD (Blu-ray Disc) recorder or a DVD or BD player, according to the user's selection. The input selection apparatus 802 outputs the selected video signal as an input video signal 823.

The image processor 803 performs, in the case where the input video signal 823 is an interlace signal, I/P conversion of converting the input video signal 823 to a progressive signal, and image quality improvement processing of improving contrast for the input video signal 823.

Moreover, the image processor 803 implements the image processing method or the image processing using the super-resolution processing program on the input video signal 823. The image processor 803 outputs the processed signal as a quality-improved video signal 824.

The panel drive apparatus 804 converts the quality-improved video signal 824 to a dedicated signal for driving the display panel 805, and outputs the converted signal as a panel drive video signal 825.

The display panel 805 converts an electrical signal to an optical signal according to the panel drive video signal 825, and displays desired video based on the converted optical signal.

In such a way, the image processor, the image processing method, and the image processing program according to Embodiments can be used in the television receiver 800. This allows the television receiver 800 to achieve the advantages described in Embodiments. Note that the image processor, the image processing method, and the image processing program according to Embodiments are not limited to use in a television receiver, and may equally be used in various digital video appliances such as a recorder, a player, and a mobile appliance. In all cases, the advantages described in Embodiments can be achieved.

Examples of the recorder include a DVD recorder, a BD recorder, and a hard disk recorder. Examples of the player include a DVD player and a BD player. Examples of the mobile appliance include a mobile phone and a Personal Digital Assistant (PDA).

Functional Block Diagram

Figure 20:
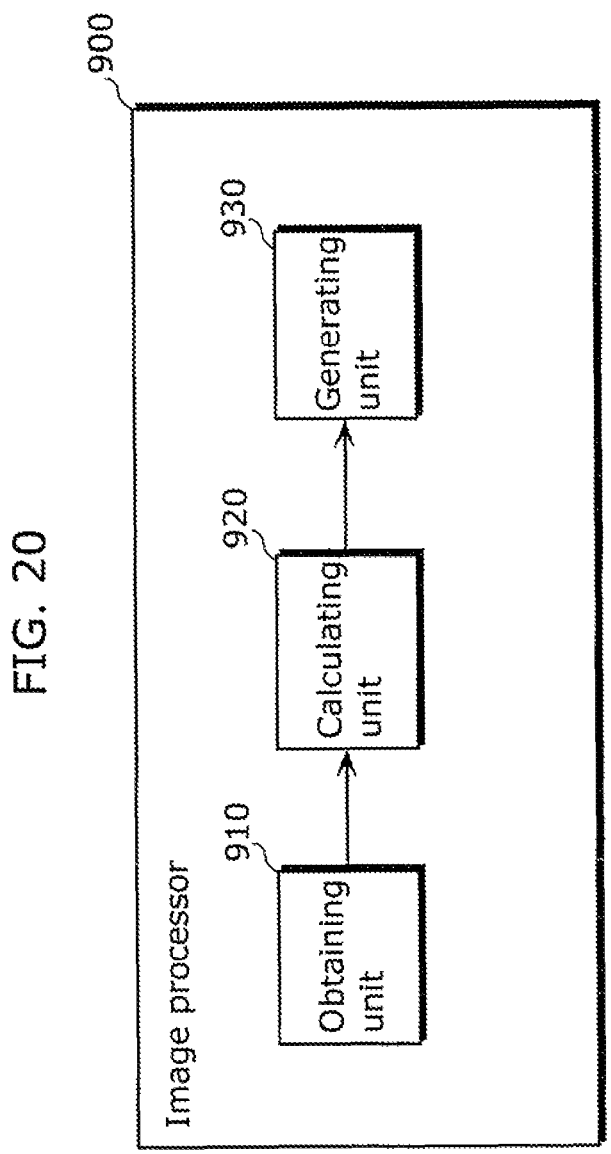
FIG. 20 is a block diagram illustrating a characteristic functional configuration of an image processor.
Figure 21:
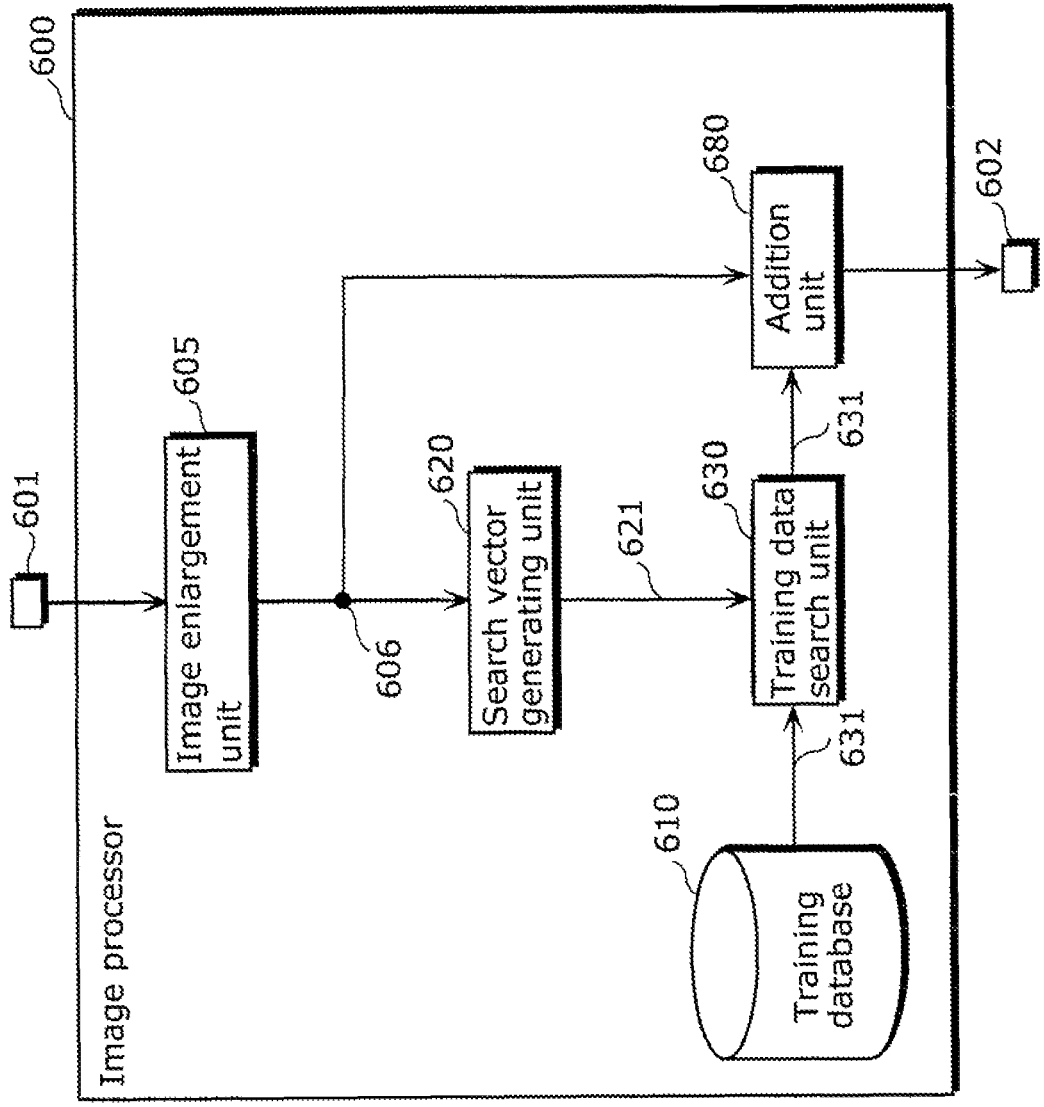
FIG. 21 is a block diagram illustrating a configuration of a conventional image processor.

FIG. 20 is a block diagram illustrating a characteristic functional configuration of an image processor 900. The image processor 900 corresponds to one of the image processors 100, 200, 300, 400, and 500. In other words, FIG. 20 is the block diagram illustrating main functions relating to the present invention from among functions included in one of the image processors 100, 200, 300, 400, and 500.

The image processor 900 generates an output image of a resolution higher than a resolution of an input image, using the input image.

The image processor 900 functionally includes an obtaining unit 910, a calculating unit 920, and a generating unit 930.

The obtaining unit 910 obtains an edge strength of one of the input image and an image corresponding to the input image. The obtaining unit 910 corresponds to the edge strength calculating units 150 and 505 and others.

The calculating unit 920 calculates, based on the edge strength, J that is a count of data items to be used for generating a synthesized image to be used in generating the output image, where J is equal to or larger than 2. The calculating unit 920 corresponds to the composite number calculating unit 160, the edge strength calculating unit 510, and others.

The generating unit 930 generates the synthesized image by synthesizing J data items, and generating the output image using the synthesized image. The generating unit 930 corresponds to the synthesizing unit 170 and the addition unit 180 that repeatedly perform Steps S1006 and S1007. Furthermore, the generating unit 930 also corresponds to the synthesizing unit 170 and the addition unit 320 in FIG. 14 that repeatedly perform Steps S1007 and S2008. Furthermore, the generating unit 930 also corresponds to the high-resolution image generating unit 530 that performs Steps S3004.

Part or all of the obtaining unit 910, the calculating unit 920, and the generating unit 930 included in the image processor 900 may be included in the hardware of a system large scale integration (LSI). Furthermore, part or all of the obtaining unit 910, the calculating unit 920, and the generating unit 930 may be a module of a program executed by a processor, such as a CPU.

Furthermore, the image processor 900 may be an integrated circuit.

Other Modifications

Although the image processor and the image processing method according to the present invention are described based on each of Embodiments, the present invention is not limited to Embodiments. Many modifications of Embodiments conceivable by those skilled in the art are intended to be included within the scope of the present invention, without materially departing from the novel teachings and advantages of the present invention.

For example, the size of the training high-frequency image P11 (first training data item) may be different from the size of the training medium-frequency image P12 (second training data item) corresponding to the training high-frequency image P11, where the training medium-frequency image P12 and the training high-frequency image P11 are stored in the training database 110. Furthermore, in this case, the first training data item may be searched (selected) using, for example, the input image 101 instead of the temporary enlarged image 121 according to Embodiment 1.

Furthermore, obviously, the present invention includes, for example, an optical disc recording system, a moving image transmitting apparatus, a digital television broadcasting apparatus, a Web server, a communication apparatus, a mobile information terminal, and others each of which includes the image processor according to each of Embodiments, and also includes a moving image receiving apparatus, a moving image recording apparatus, a still image recording apparatus, a digital television broadcast receiving apparatus, a communication apparatus, a mobile information terminal, and others each of which includes the image processor according to each of Embodiments. Here, examples of the moving image recording apparatus include a camcorder and a web server, and examples of the still image recording apparatus include a digital still camera.

The values used in all Embodiments are examples of values for specifically describing the present invention. In other words, the present invention is not limited to each of the values used in Embodiments.

Furthermore, the image processing method according to the present invention corresponds to one of the high-resolution image generation processes A in FIG. 4, the high-resolution image generation processes A in FIG. 10, the high-resolution image generation processes B in FIG. 13, and the high-resolution image generation processes C in FIG. 16. The image processing method according to the present invention does not necessarily have to include all the steps in one of FIGS. 4, 10, 13, and 16. In other words, the depth image processing method according to the present invention has only to include steps as little as possible to produce the advantages of the present invention.

Furthermore, the procedure to implement each of the steps included in the image processing method is an example for specifically describing the present invention, and other procedure may be used. Furthermore, part of the steps in the image processing method may be performed in parallel with and separately from other steps. For example, in the high-resolution image generation processes in FIG. 4 as the image processing method, Steps S1002 and 1003 may be performed in parallel with and separately from Steps S1004 and 1005.

Part or al of the functional patches (constituent elements) of each of the image processors 100 to 500 are typically implemented as a system large scale integration (LSI) that is an integrated circuit. These patches can be made in plural single-function LSIs, or also can be made in one integrated LSI.

The name used here is LSI, but it may also be called IC, system LSI, super LSI, or ultra LSI depending on the degree of integration.

Moreover, not only the LSI, but also a special circuit or a general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Moreover, with advancement in semiconductor technology and appearance of derivatives of the technology that may replace LSI, the functional patches may be integrated using that technology. Application of biotechnology is one such possibility.

Furthermore, among these patches (constituent elements), a portion for storing data to be searched can be differently configured without being made in one integrated LSI.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image processing method and the image processor according to the present invention can generate a high-resolution image with higher definition, and are effective for a camcorder and a digital still camera, for example.

What is claimed is:
1. An image processing method of generating an output image of a resolution higher than a resolution of an input image, using the input image, said method comprising:
obtaining an edge strength of one of the input image and an image corresponding to the input image;
calculating, based on the edge strength, J that is a count of data items to be used for generating a synthesized image to be used in generating the output image, where J is an integer equal to or larger than 2;

generating the synthesized image by synthesizing J data items, and generating the output image using the synthesized image;

enlarging the input image to generate an enlarged image; and selecting, from K first training data items in a training database, L first training data items respectively corresponding to L second training data items similar to first feature data indicating a feature of a target block included in the enlarged image, the training database storing K pairs of training data items of the K first training data items and K second training data items that are respectively associated with the K first training data items, each of the first training data items being obtained from a high-frequency component of a training image, and each of the second training data items being obtained from at least a low-frequency component of the training image, where K is an integer equal to or larger than 2, and L satisfies 2≦L≦K, wherein the data items synthesized in the synthesizing are the first training data items, and in said generating, the synthesized image is generated by synthesizing J first training data items from among the L first training data items, and the output image is generated by adding the synthesized image to the enlarged image, where J satisfies 2≦J≦L.

2. The image processing method according to claim 1, wherein in said calculating of J, a larger J is calculated as the edge strength is greater, and a smaller J is calculated as the edge strength is smaller.

3. The image processing method according to claim 1, further comprising
extracting the first feature data from the target block.

4. The image processing method according to claim 1, wherein in said selecting, a similarity between the first feature data and each of the K second training data items is calculated, and the L first training data items which respectively correspond to the top L second training data items having higher similarities to the first feature data are selected.

5. The image processing method according to claim 1, wherein the synthesized image is larger than the target block,
said image processing method further comprises
calculating, based on the edge strength, a region size that is a size of an overlap region obtained by synthesizing at least parts of a plurality of synthesized images including the synthesized image, the overlap region being equal to or smaller than the synthesized image and larger than the target block, and
in said generating, the synthesized image of the calculated region size among the synthesized images is added to the enlarged image.

6. The image processing method according to claim 5, wherein in said calculating of a region size, a larger region size is calculated as the edge strength is greater.

7. The image processing method according to claim 5, wherein in said generating, a weighted sum of the enlarged image and the synthesized image of the region size is calculated, based on the region size.

8. The image processing method according to claim 1, wherein in said obtaining, the edge strength is obtained by calculating an edge strength of a block image that is a part of the input image, and the target block is an image obtained by enlarging the block image.

9. The image processing method according to claim 1, wherein in said obtaining, the edge strength is obtained by calculating an edge strength based on values obtained by a difference between the target block and each of the L first training data items.

10. The image processing method according to claim 1, wherein the first feature data is an image of a medium-frequency component in the target block.

11. An image processor that generates an output image of a resolution higher than a resolution of an input image, using the input image, said apparatus comprising:
an obtaining unit configured to obtain an edge strength of one of the input image and an image corresponding to the input image;
a calculating unit configured to calculate, based on the edge strength, J that is a count of data items to be used for generating a synthesized image to be used in generating the output image, where J is an integer equal to or larger than 2;
a generating unit configured to generate the synthesized image by synthesizing J data items, and generate the output image using the synthesized image;
an image enlargement unit configured to enlarge the input image to generate an enlarged image; and
a training data search unit configured to select, from K first training data items in a training database, L first training data items respectively corresponding to L second training data items similar to first feature data indicating a feature of a target block included in the enlarged image, the training database storing K pairs of training data items of the K first training data items and K second training data items that are respectively associated with the K first training data items, each of the first training data items being obtained from a high-frequency component of a training image, and each of the second training data items being obtained from at least a low-frequency component of the training image, where K is an integer equal to or larger than 2, and L satisfies 2≦L≦K,
wherein the data items synthesized in the synthesizing by the generating unit are the first training data items, and
in said generating unit, the synthesized image is generated by synthesizing J first training data items from among the L first training data items, and the output image is generated by adding the synthesized image to the enlarged image, where J satisfies 2≦J≦L.

12. An integrated circuit that generates an output image of a resolution higher than a resolution of an input image, using the input image, said integrated circuit comprising:
an obtaining unit configured to obtain an edge strength of one of the input image and an image corresponding to the input image;
a calculating unit configured to calculate, based on the edge strength, J that is a count of data items to be used for generating a synthesized image to be used in generating the output image, where J is an integer equal to or larger than 2;
a generating unit configured to generate the synthesized image by synthesizing J data items, and generate the output image using the synthesized image;
an image enlargement unit configured to enlarge the input image to generate an enlarged image; and
a training data search unit configured to select, from K first training data items in a training database, L first training data items respectively corresponding to L second training data items similar to first feature data indicating a feature of a target block included in the enlarged image, the training database storing K pairs of training data items of the K first training data items and K second training data items that are respectively associated with the K first training data items, each of the first training data items being obtained from a high-frequency component of a training image, and each of the second training data items being obtained from at least a low-frequency component of the training image, where K is an integer equal to or larger than 2, and L satisfies $2 \leq L \leq K$, wherein the data items synthesized in the synthesizing by the generating unit are the first training data items, and in said generating unit, the synthesized image is generated by synthesizing J first training data items from among the L first training data items, and the output image is generated by adding the synthesized image to the enlarged image, where J satisfies $2 \leq J \leq L$.

13. A non-transitory computer-readable recording medium on which a program, for an image processor that generates an output image of a resolution higher than a resolution of an input image, using the input image, is stored, the program causing a computer to execute:

obtaining an edge strength of one of the input image and an image corresponding to the input image;

calculating, based on the edge strength, J that is a count of data items to be used for generating a synthesized image to be used in generating the output image, where J is an integer equal to or larger than 2;

generating the synthesized image by synthesizing J data items, and generating the output image using the synthesized image;

enlarging the input image to generate an enlarged image; and selecting, from K first training data items in a training database, L first training data items respectively corresponding to L second training data items similar to first feature data indicating a feature of a target block included in the enlarged image, the training database storing K pairs of training data items of the K first training data items and K second training data items that are respectively associated with the K first training data items, each of the first training data items being obtained from a high-frequency component of a training image, and each of the second training data items being obtained from at least a low-frequency component of the training image, where K is an integer equal to or larger than 2, and L satisfies $2 \leq L \leq K$, wherein the data items synthesized in the synthesizing are the first training data items, and in said generating, the synthesized image is generated by synthesizing J first training data items from among the L first training data items, and the output image is generated by adding the synthesized image to the enlarged image, where J satisfies $2 \leq J \leq L$.

* * * * *